(12) United States Patent
Salvador et al.

(10) Patent No.: US 10,749,214 B2
(45) Date of Patent: Aug. 18, 2020

(54) SULFIDE AND OXY-SULFIDE GLASS AND GLASS-CERAMIC SOLID STATE ELECTROLYTES FOR ELECTROCHEMICAL CELLS

(71) Applicant: GM GLOBAL TECHNOLOGY OPERATIONS LLC, Detroit, MI (US)

(72) Inventors: James R. Salvador, Royal Oak, MI (US); Thomas A. Yersak, Ferndale, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 143 days.

(21) Appl. No.: 15/992,514

(22) Filed: May 30, 2018

(65) Prior Publication Data
US 2019/0372164 A1 Dec. 5, 2019

(51) Int. Cl.
*H01M 10/00* (2006.01)
*H01M 10/0568* (2010.01)
(Continued)

(52) U.S. Cl.
CPC ....... *H01M 10/0568* (2013.01); *H01M 4/382* (2013.01); *H01M 10/0569* (2013.01); *H01M 10/0585* (2013.01); *H01M 2300/0037* (2013.01)

(58) Field of Classification Search
CPC ..... H01M 2300/0037; H01M 10/0585; H01M 10/0568; H01M 4/382; H01M 10/0569
See application file for complete search history.

(56) References Cited

U.S. PATENT DOCUMENTS 8,974,946 B2 3/2015 Cai et al.
9,123,939 B2 9/2015 Xiao et al.
(Continued)

FOREIGN PATENT DOCUMENTS

CN 110556569 A 12/2019
DE 102019111405 A1 12/2019
WO WO-2017045573 A1 3/2017

OTHER PUBLICATIONS

Fang Dai et al.; U.S. Appl. No. 15/677,760, filed Aug. 15, 2017 entitled "Lithium Metal Battery With Hybrid Electrolyte System"; 48 pages.
(Continued)

*Primary Examiner* — Cynthia H Kelly
*Assistant Examiner* — Monique M Wills
(74) *Attorney, Agent, or Firm* — Harness, Dickey & Pierce, P.L.C.

(57) ABSTRACT

An electrolyte system for an electrochemical cell includes an aprotic solvent, such as an ether-based solvent and a lithium salt, and a solid component. The aprotic solvent has a dielectric constant of ≥3. The solid component is in direct communication with the aprotic solvent. The solid component includes a sulfide or oxy-sulfide, glass or glass-ceramic electrolyte. The sulfide or oxy-sulfide, glass or glass-ceramic electrolyte has a weighted average bond dissociation enthalpy of greater than or equal to about 380 kJ/mol, which corresponds to a glass having strong bonds. The sulfide or oxy-sulfide, glass or glass-ceramic electrolyte is therefore insoluble in the aprotic solvent. The solid component is lithium ion-conducting and electrically insulating. The electrolyte system may be disposed between a positive electrode and a negative electrode in an electrochemical cell. In various aspects, the negative electrode includes lithium metal and the positive electrode includes sulfur.

20 Claims, 9 Drawing Sheets

(51) Int. Cl.
    *H01M 10/0585* (2010.01)
    *H01M 4/38* (2006.01)
    *H01M 10/0569* (2010.01)

(56) References Cited

U.S. PATENT DOCUMENTS

| | | | |
|---|---|---|---|
| 9,160,036 | B2 | 10/2015 | Yang et al. |
| 9,252,411 | B2 | 2/2016 | Abd Elhamid et al. |
| 9,302,914 | B2 | 4/2016 | Liu et al. |
| 9,362,552 | B2 | 6/2016 | Sohn et al. |
| 9,373,829 | B2 | 6/2016 | Xiao et al. |
| 9,437,871 | B2 | 9/2016 | Zhou et al. |
| 9,537,144 | B2 | 1/2017 | Huang et al. |
| 9,647,254 | B2 | 5/2017 | Dadheech et al. |
| 9,742,028 | B2 | 8/2017 | Zhou et al. |
| 9,896,763 | B2 | 2/2018 | Dadheech et al. |
| 9,905,847 | B2 | 2/2018 | Dadheech et al. |
| 10,381,170 | B2 | 8/2019 | Dai et al. |
| 10,431,849 | B2 | 10/2019 | Yersak et al. |
| 2015/0056387 | A1 | 2/2015 | Dadheech et al. |
| 2015/0056493 | A1 | 2/2015 | Dadheech et al. |
| 2015/0056507 | A1 | 2/2015 | Dadheech et al. |
| 2015/0236324 | A1 | 8/2015 | Xiao et al. |
| 2015/0349307 | A1 | 12/2015 | Dadheech et al. |
| 2016/0020491 | A1 | 1/2016 | Dai et al. |
| 2016/0111721 | A1 | 4/2016 | Xiao et al. |
| 2016/0141598 | A1 | 5/2016 | Dai et al. |
| 2016/0172665 | A1 | 6/2016 | Zhou et al. |
| 2016/0172681 | A1 | 6/2016 | Yang et al. |
| 2016/0172706 | A1 | 6/2016 | Xiao et al. |
| 2016/0172710 | A1 | 6/2016 | Liu et al. |
| 2016/0218342 | A1 | 7/2016 | Xiao et al. |
| 2016/0254567 | A1 | 9/2016 | Cai et al. |
| 2017/0141382 | A1 | 5/2017 | Dadheech et al. |
| 2017/0162859 | A1 | 6/2017 | Yang et al. |
| 2017/0214079 | A1 | 7/2017 | Dai et al. |
| 2017/0222210 | A1 | 8/2017 | Xiao |
| 2017/0271678 | A1 | 9/2017 | Yang et al. |
| 2017/0288230 | A1 | 10/2017 | Yang et al. |
| 2017/0338490 | A1 | 11/2017 | Xiao et al. |
| 2018/0048022 | A1 | 2/2018 | Yang et al. |
| 2018/0294517 | A1 | 10/2018 | Yersak et al. |
| 2018/0309166 | A1 | 10/2018 | Yersak et al. |
| 2018/0375148 | A1 | 12/2018 | Yersak et al. |
| 2019/0058210 | A1 | 2/2019 | Dai et al. |
| 2019/0140265 | A1* | 5/2019 | Miara .................. H01M 4/366 |
| 2019/0173128 | A1* | 6/2019 | Visco ................ H01M 10/0562 |

OTHER PUBLICATIONS

Ito et al., "A synthesis of crystalline $Li_7P_3S_{11}$ solid electrolyte from 1,2-dimethoxyethane solvent"; *Journla of Power Sources*, 271, 2014, pp. 342-345.

Qian, J. et al.; "High rate and stable cycling of lithium metal anode"; Nat. Commun. 6:6362 DOI: 10.1038/ncomms7362 (2015), 9 pages.

S. Martin, "Glass and Glass-Ceramic Sulfide and Oxy-Sulfide Solid Electrolytes" in eds. N. J. Dudney et al. Handbook of Solid State Batteries, World Scientific, 2nd ed., 2016, pp. 433-501.

Sharafi et al., "Characterizing the $Li-Li_7La_3Zr_2O_{12}$ interface stability and kinetics as a function of temperature and current density"; *Journal of Power Sources*, 302, 2016 pp. 135-139.

C. Stoldt and S.H. Lee, "All-Solid-State Lithium Metal Batteries for Next Generation Energy Storage"; 2013 Transducers & Eurosensors XXVII: The 17th International Conference on. IEEE, 2013, 4 pages.

* cited by examiner

SULFIDE AND OXY-SULFIDE GLASS AND GLASS-CERAMIC SOLID STATE ELECTROLYTES FOR ELECTROCHEMICAL CELLS

INTRODUCTION

This section provides background information related to the present disclosure which is not necessarily prior art.

The present disclosure relates to sulfide and oxy-sulfide glass and glass-ceramic solid state electrolytes for electrochemical cells, and more particularly, to sulfide and oxy-sulfide glass and glass-ceramic solid state electrolytes that are insoluble in ether-based electrolytes.

High-energy density, electrochemical cells, such as lithium-ion batteries can be used in a variety of consumer products and vehicles, such as Hybrid Electric Vehicles (HEVs) and Electric Vehicles (EVs). Typical lithium-ion and lithium sulfur batteries include two electrodes, an electrolyte material, and a separator. One electrode serves as a positive electrode or cathode and another serves as a negative electrode or anode. A stack of battery cells may be electrically connected to increase overall output. Conventional rechargeable lithium-ion batteries operate by reversibly passing lithium ions back and forth between the negative electrode and the positive electrode. A separator and an electrolyte may be disposed between the negative and positive electrodes. The electrolyte is suitable for conducting lithium ions and may be in solid and/or liquid form. Lithium ions move from the positive electrode to the negative electrode during charging of the battery, and in the opposite direction when discharging the battery.

Various materials may be used to create components for a lithium-ion battery. Common negative electrode materials include lithium insertion materials or alloy host materials, like carbon-based materials, such as lithium-graphite intercalation compounds, or lithium-silicon compounds, lithium-tin alloys, and lithium titanate $Li_{4+x}Ti_5O_{12}$, where $0 \leq x \leq 3$, such as $Li_4Ti_5O_{12}$ (LTO). Where the negative electrode is made of metallic lithium, the electrochemical cell is considered a lithium metal battery or cell. Metallic lithium for use in the negative electrode of a rechargeable battery has various potential advantages, including having the highest theoretical capacity and lowest electrochemical potential. Thus, batteries incorporating lithium metal anodes can have a higher energy density that can potentially double storage capacity, so that the battery may be half the size, but still last the same amount of time as other lithium-ion batteries. Thus, lithium metal batteries are one of the most promising candidates for high energy storage systems. However, lithium metal batteries also have potential downsides, including possibly exhibiting unreliable or diminished performance and potential premature electrochemical cell failure.

There are two primary causes for performance degradation with lithium negative electrodes. Side reactions can occur between the lithium metal and species in the adjacent electrolyte disposed between the positive and negative electrodes, which can compromise coulombic efficiency and cycling lifetime of rechargeable lithium batteries. Also, when the lithium metal is recharged, branchlike or fiber-like metal structures, referred herein to as lithium deposits, can grow on the negative electrode. The lithium deposits may form sharp protrusions that potentially puncture the separator and cause an internal short circuit, which may cause cell self-discharge or cell failure through thermal runaway.

SUMMARY

This section provides a general summary of the disclosure, and is not a comprehensive disclosure of its full scope or all of its features.

In various aspects, the present disclosure provides an electrolyte system for an electrochemical cell. The electrolyte system includes an aprotic solvent and a solid component. The aprotic solvent has a dielectric constant of $\geq 3$. The solid component is in direct communication with the aprotic solvent. The solid component includes a sulfide or oxy-sulfide, glass or glass-ceramic electrolyte having the empirical composition $n_M(M)\text{-}n_F(F)\text{-}n_C(C)\text{-}n_D(D)$. M is a glass modifier including a sulfide or an oxide. F is a glass former including a glass-forming sulfide or oxide. C is a glass co-former or a glass co-modifier including sulfide or oxide different than the glass former and the glass modifier. D is a dopant. $n_M$ is a mole fraction of M. $n_F$ is a mole fraction of F. $n_C$ is a mole fraction of C. $n_D$ is a mole fraction of D. At least one of M, F, and C includes a sulfide. $n_M > 0$, $n_F > 0$, $n_C \geq 0$, and $n_D \geq 0$. The sulfide or oxy-sulfide, glass or glass-ceramic electrolyte has a weighted average bond dissociation enthalpy ($BDE_{WA}$) of $\geq 380$ kJ/mol. $BDE_{WA}$ is calculated according to the following formula:

$$BDE_{WA} = \frac{w_M n_M BDE_M}{w_M n_M + w_F n_F + w_C n_C + w_D n_D} + \frac{w_F n_F BDE_F}{w_M n_M + w_F n_F + w_C n_C + w_D n_D} + \frac{w_C n_C BDE_C}{w_M n_M + w_F n_F + w_C n_C + w_D n_D} + \frac{w_D n_D BDE_D}{w_M n_M + w_F n_F + w_C n_C + w_D n_D}.$$

$BDE_M$ is a bond dissociation enthalpy required to break a single bond of distinct constituents of M. $BDE_F$ is a bond dissociation enthalpy required to break a single bond of distinct constituents of F. $BDE_C$ is a bond dissociation enthalpy required to break a single bond of distinct constituents of C. $BDE_D$ is a bond dissociation enthalpy required to break a single bond of distinct constituents of D. $w_M$ is a quantity of sulfur or oxygen bonds that M contributes to the sulfide or oxy-sulfide glass or glass-ceramic electrolyte. $w_F$ is a quantity of sulfur or oxygen bonds that F contributes to the sulfide or oxy-sulfide glass or glass-ceramic electrolyte. we is a quantity of sulfur or oxygen bonds that C contributes to the sulfide or oxy-sulfide glass or glass-ceramic electrolyte. $W_D$ is a quantity of sulfur, oxygen, iodine, or chlorine bonds that D contributes to the sulfide or oxy-sulfide glass or glass-ceramic electrolyte. The solid component is lithium ion-conducting and electrically insulating.

In one aspect, $n_C = 0$.

In one aspect, $n_D = 0$.

In one aspect, the glass modifier is selected from the group consisting of: $Li_2O$, $Li_2S$, and combinations thereof.

In one aspect, the glass modifier is $Li_2S$.

In one aspect, the dopant is selected from the group consisting of: $LiI$, $Li_3PO_4$, $Li_4SiO_4$, $LiCl$, and combinations thereof.

In one aspect, at least one of the glass former, the glass modifier, the glass co-former, and the glass former has a composition selected from the group consisting of: $P_2S_5$, $SnS_2$, $SiO_2$, $GeO_2$, $GeS_2$, $B_2S_3$, $P_2O_5$, $SiS_2$, and $B_2O_3$, and combinations thereof.

In one aspect, at least one of the glass former, the glass modifier, the glass co-former, and the glass co-modifier has a composition selected from the group consisting of: $GeS_2$, $B_2S_3$, $P_2O_5$, $SiS_2$, and $B_2O_3$, and combinations thereof.

In one aspect, the aprotic solvent includes an ether-based solvent having a lithium salt dissolved therein. The ether-based solvent is selected from the group consisting of: 1,3-dioxolane (DOL), dimethoxyethane (DME), tetrahydrofuran, 2-methyltetrahydrofuran, 1,2-diethoxyethane, ethoxymethoxyethane, tetraethylene glycol dimethyl ether (TEGDME), polyethylene glycol dimethyl ether (PEGDME), and admixtures thereof. The lithium salt is selected from the group consisting of: $LiN(CF_3SO_2)_2$, LiTFSI, $LiNO_3$, $LiPF_6$, $LiBF_4$, LiI, LiBr, LiSCN, $LiClO_4$, $LiAlCl_4$, $LiB(C_2O_4)_2$ (LiBOB), $LiB(C_6H5)_4$, $LiBF_2(C_2O_4)$ (LiODFB), $LiN(SO_2F)_2$ (LiFSI), $LiPF_3(C_2F_5)_3$ (LiFAP), $LiPF_4(CF_3)_2$, $LiPF_4(C_2O_4)$ (LiFOP), $LiPF_3(CF_3)_3$, $LiSO_3CF_3$, $LiCF_3SO_3$, $LiAsF_6$, and combinations thereof.

In one aspect, $BDE_{WA} \geq 410$ kJ/mol.

In one aspect, the solid component further includes a polymer. The solid component has one of: (a) a composite structure including the polymer and the sulfide or oxy-sulfide, glass or glass-ceramic electrolyte, or (b) a laminate structure including one or more layers of the polymer and the sulfide or oxy-sulfide, glass or glass-ceramic electrolyte.

In one aspect, one of the glass former and the glass co-former includes $P_2S_5$. The other of the glass former and the glass co-former includes $SiS_2$. The glass modifier includes $Li_2S$. $n_M \geq 0.4$.

In one aspect, one of the glass former and the glass co-former includes $P_2S_5$. The other of the glass former and the glass co-former includes $B_2O_3$. The glass modifier includes $Li_2S$. $n_M \geq 0.7$.

In one aspect, the sulfide or oxy-sulfide, glass or glass-ceramic electrolyte includes: $(Li_2S)_{50}(SiS_2)_{45}(GeO_2)_5$, $(Li_2S)_{60}(SiS_2)_{32}(P_2S_5)_8$, $(Li_2S)_{60}(SiS_2)_{30}(P_2S_5)_{10}$, $(Li_2S)_{57}(SiS_2)_{35}(P_2S_5)_5$, $(Li_2S)_{60}(SiS_2)_{28}(P_2S_5)_{12}$, or $(Li_2S)_{53.6}(SiS_2)_{32.9}(P_2S_5)_{7.5}(LiI)_6$.

In other aspects, the present disclosure provides an electrochemical cell. The electrochemical cell includes a positive electrode, a negative electrode, and an electrolyte system. The positive electrode includes a positive electroactive material. The negative electrode includes a negative electroactive material. The electrolyte system is disposed between the positive electrode and the negative electrode. The electrode system includes an aprotic solvent and a solid component. The aprotic solvent has a dielectric constant of $\geq 3$. The solid component is in direct communication with the aprotic solvent. The solid component includes a sulfide or oxy-sulfide, glass or glass-ceramic electrolyte. The sulfide or oxy-sulfide, glass or glass-ceramic electrolyte has the empirical composition $n_M(M)$-$n_F(F)$-$n_C(C)$-$n_D(D)$. M is a glass modifier including a sulfide or an oxide. F is a glass former including a glass-forming sulfide or oxide. C is a glass co-former or glass co-modifier including a sulfide or oxide different than the glass former and the glass modifier. D is a dopant. $n_M$ is a mole fraction of M. $n_F$ is a mole fraction of F. $n_C$ is a mole fraction of C. $n_D$ is a mole fraction of D. At least one of the M, F, and C includes a sulfide. $n_M > 0$, $n_F > 0$, and $n_C \geq 0$. The sulfide or oxy-sulfide, glass or glass-ceramic electrolyte has a weighted average bond dissociation enthalpy ($BDE_{WA}$) of $\geq 380$ kJ/mol. $BDE_{WA}$ is calculated according to the following equation:

$$BDE_{WA} = \frac{w_M n_M BDE_M}{w_M n_M + w_F n_F + w_C n_C + w_D n_D} + \frac{w_F n_F BDE_F}{w_M n_M + w_F n_F + w_C n_C + w_D n_D} + \frac{w_C n_C BDE_C}{w_M n_M + w_F n_F + w_C n_C + w_D n_D} + \frac{w_D n_D BDE_D}{w_M n_M + w_F n_F + w_C n_C + w_D n_D}.$$

$BDE_M$ is a bond dissociation enthalpy required to break a single bond of distinct constituents of M. $BDE_F$ is a bond dissociation enthalpy required to break a single bond of distinct constituents of F. $BDE_C$ is a bond dissociation enthalpy required to break a single bond of distinct constituents of C. $BDE_D$ is a bond dissociation enthalpy required to break a single bond of distinct constituents of D. $w_M$ is a quantity of sulfur or oxygen bonds that M contributes to the sulfide or oxy-sulfide glass or glass-ceramic electrolyte. $w_F$ is a quantity of sulfur or oxygen bonds that F contributes to the sulfide or oxy-sulfide glass or glass-ceramic electrolyte. $w_C$ is a quantity of sulfur or oxygen bonds that C contributes to the sulfide or oxy-sulfide glass or glass-ceramic electrolyte. $W_D$ is a quantity of sulfur, oxygen, iodine, or chlorine bonds that D contributes to the sulfide or oxy-sulfide glass or glass-ceramic electrolyte. The solid component is lithium ion-conducting and electrically insulating.

In various aspects, the positive electroactive material includes sulfur.

In various aspects, the aprotic solvent includes an ether-based solvent. The negative electroactive material is in communication with the ether-based solvent. The negative electroactive material includes lithium.

In various aspects, the aprotic solvent includes an ether-based solvent having a lithium salt dissolved therein. The ether-based solvent is selected from the group consisting of: 1,3-dioxolane (DOL), dimethoxyethane (DME), tetrahydrofuran, 2-methyltetrahydrofuran, 1,2-diethoxyethane, ethoxymethoxyethane, tetraethylene glycol dimethyl ether (TEGDME), polyethylene glycol dimethyl ether (PEGDME), and admixtures thereof. The lithium salt is selected from the group consisting of: $LiN(CF_3SO_2)_2$, LiTFSI, $LiNO_3$, $LiPF_6$, $LiBF_4$, LiI, LiBr, LiSCN, $LiClO_4$, $LiAlCl_4$, $LiB(C_2O_4)_2$ (LiBOB), $LiB(C_6H5)_4$, $LiBF_2(C_2O_4)$ (LiODFB), $LiN(SO_2F)_2$ (LiFSI), $LiPF_3(C_2F_5)_3$ (LiFAP), $LiPF_4(CF_3)_2$, $LiPF_4(C_2O_4)$ (LiFOP), $LiPF_3(CF_3)_3$, $LiSO_3CF_3$, $LiCF_3SO_3$, $LiAsF_6$, and combinations thereof.

In one aspect, the solid component further includes a polymer.

In one aspect, the solid component has one of: (a) a composite structure including the polymer and the sulfide or oxy-sulfide, glass or glass-ceramic electrolyte, or (b) a laminate structure including one or more layers of the polymer and the sulfide or oxy-sulfide, glass or glass-ceramic electrolyte.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 1 is a schematic of an exemplary electrochemical battery cell;

FIGS. 2A-2B describe an exemplary $Li_2S$—$P_2S_5$—$SiS_2$ system; FIG. 2A is a ternary diagram; FIG. 2B is a contour plot showing weighted average bond dissociation enthalpy ($BDE_{WA}$) as a function of composition;

FIGS. 3A-3B describe an exemplary $Li_2S$—$P_2O_5$—$P_2S_5$ system; FIG. 3A is a ternary diagram; FIG. 3B is a contour plot showing $BDE_{WA}$ as a function of composition;

FIGS. 4A-4B describe an exemplary $Li_2S$—$P_2S_5$—$B_2O_3$ system; FIG. 4A is a ternary diagram; FIG. 4B is a contour plot showing $BDE_{WA}$ as a function of composition;

Corresponding reference numerals indicate corresponding parts throughout the several views of the drawings.

DETAILED DESCRIPTION

Figure 1:
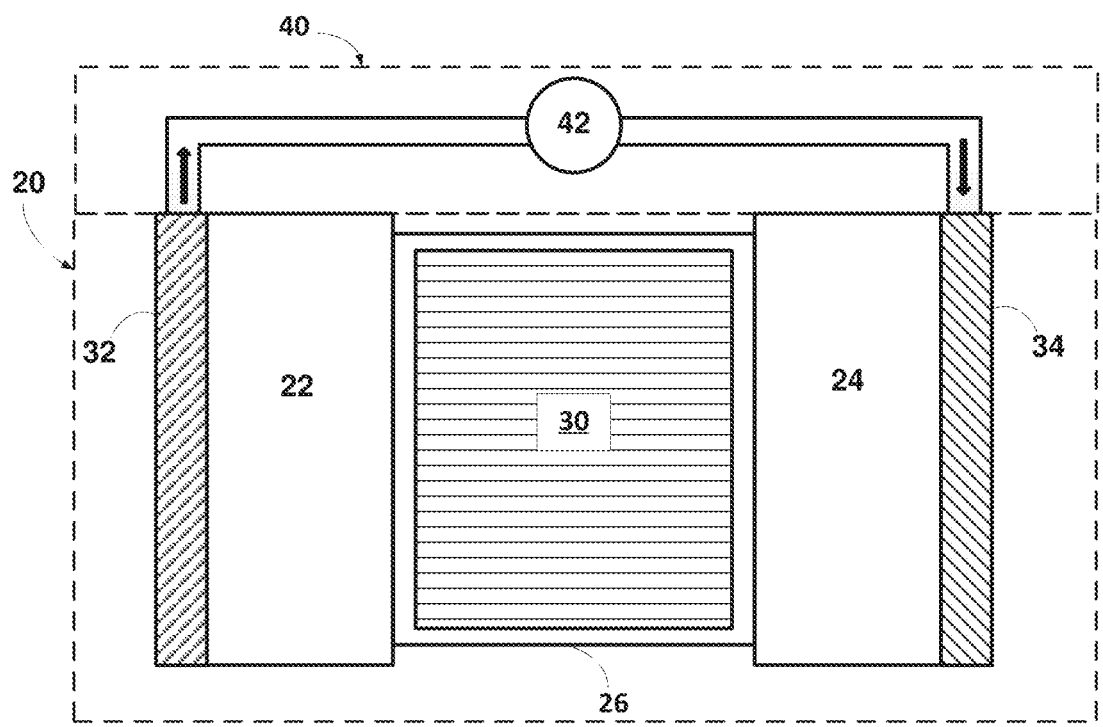

Example embodiments are provided so that this disclosure will be thorough, and will fully convey the scope to those who are skilled in the art. Numerous specific details are set forth such as examples of specific compositions, components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, elements, compositions, steps, integers, operations, and/or components, but do not preclude the presence or addition of one or more other features, integers, steps, operations, elements, components, and/or groups thereof. Although the open-ended term "comprising," is to be understood as a non-restrictive term used to describe and claim various embodiments set forth herein, in certain aspects, the term may alternatively be understood to instead be a more limiting and restrictive term, such as "consisting of" or "consisting essentially of." Thus, for any given embodiment reciting compositions, materials, components, elements, features, integers, operations, and/or process steps, the present disclosure also specifically includes embodiments consisting of, or consisting essentially of, such recited compositions, materials, components, elements, features, integers, operations, and/or process steps. In the case of "consisting of," the alternative embodiment excludes any additional compositions, materials, components, elements, features, integers, operations, and/or process steps, while in the case of "consisting essentially of," any additional compositions, materials, components, elements, features, integers, operations, and/or process steps that materially affect the basic and novel characteristics are excluded from such an embodiment, but any compositions, materials, components, elements, features, integers, operations, and/or process steps that do not materially affect the basic and novel characteristics can be included in the embodiment.

Any method steps, processes, and operations described herein are not to be construed as necessarily requiring their performance in the particular order discussed or illustrated, unless specifically identified as an order of performance. It is also to be understood that additional or alternative steps may be employed, unless otherwise indicated.

When a component, element, or layer is referred to as being "on," "engaged to," "connected to," or "coupled to" another element or layer, it may be directly on, engaged, connected or coupled to the other component, element, or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various steps, elements, components, regions, layers and/or sections, these steps, elements, components, regions, layers and/or sections should not be limited by these terms, unless otherwise indicated. These terms may be only used to distinguish one step, element, component, region, layer or section from another step, element, component, region, layer or section. Terms such as "first," "second," and other numerical terms when used herein do not imply a sequence or order unless clearly indicated by the context. Thus, a first step, element, component, region, layer or section discussed below could be termed a second step, element, component, region, layer or section without departing from the teachings of the example embodiments.

Spatially or temporally relative terms, such as "before," "after," "inner," "outer," "beneath," "below," "lower," "above," "upper," and the like, may be used herein for ease of description to describe one element or feature's relationship to another element(s) or feature(s) as illustrated in the figures. Spatially or temporally relative terms may be intended to encompass different orientations of the device or system in use or operation in addition to the orientation depicted in the figures.

Throughout this disclosure, the numerical values represent approximate measures or limits to ranges to encompass minor deviations from the given values and embodiments having about the value mentioned as well as those having exactly the value mentioned. Other than in the working examples provided at the end of the detailed description, all numerical values of parameters (e.g., of quantities or conditions) in this specification, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. For example, "about" may comprise a variation of less than or equal to 5%, optionally less than or equal to 4%, optionally less than or equal to 3%, optionally less than or equal to 2%, optionally less than or equal to 1%, optionally less than or equal to 0.5%, and in certain aspects, optionally less than or equal to 0.1%.

In addition, disclosure of ranges includes disclosure of all values and further divided ranges within the entire range, including endpoints and sub-ranges given for the ranges.

Example embodiments will now be described more fully with reference to the accompanying drawings.

In various aspects, the present disclosure provides an electrolyte system that includes a solid component and an ether-based electrolyte. The solid component includes a sulfide or oxy-sulfide glass or glass-ceramic electrolyte that directly communicates with the ether-based electrolyte and does not dissolve in the ether-based electrolyte. The electrolyte system may be used in an electrochemical cell, such as a lithium-sulfur cell by way of example.

General Structure and Function of Electrochemical Cells

An exemplary and schematic illustration of an electrochemical cell or battery 20 that cycles lithium ions is shown in FIG. 1. The battery 20 includes a negative electrode 22, a positive electrode 24, and a porous separator 26 (e.g., a microporous or nanoporous polymeric separator) disposed between the two electrodes 22, 24. The porous separator 26 includes an electrolyte 30, which may also be present in the negative electrode 22 and the positive electrode 24. A negative electrode current collector 32 may be positioned at or near the negative electrode 22 and a positive electrode current collector 34 may be positioned at or near the positive electrode 24. The negative electrode current collector 32 and the positive electrode current collector 34 respectively collect and move free electrons to and from an external circuit 40. An interruptible external circuit 40 and load device 42 connects the negative electrode 22 (through its current collector 32) and the positive electrode 24 (through its current collector 34).

The porous separator 26 operates as both an electrical insulator and a mechanical support. The separator 26 is located, by being "sandwiched" between the negative electrode 22 and the positive electrode 24 so as to prevent physical contact between the electrodes 22, 24 and thus, the occurrence of a short circuit. The porous separator 26, in addition to providing a physical barrier between the two electrodes 22, 24, can provide a minimal resistance path for internal passage of lithium ions (and related anions) during cycling of the lithium ions to facilitate functioning of the battery 20.

The battery 20 can generate an electric current during discharge by way of reversible electrochemical reactions that occur when the external circuit 40 is closed (to connect the negative electrode 22 and the positive electrode 34) when the negative electrode 22 contains a relatively greater quantity of lithium. The chemical potential difference between the positive electrode 24 and the negative electrode 22 drives electrons produced at the negative electrode 22 through the external circuit 40 toward the positive electrode 24. Lithium ions, which are also produced at the negative electrode 22, are concurrently transferred through the electrolyte 30 and porous separator 26 towards the positive electrode 24. The electrons flow through the external circuit 40 and the lithium ions migrate across the porous separator 26 in the electrolyte 30 to the positive electrode 24, where they may be plated, reacted, or intercalated. The electric current passing through the external circuit 40 can be harnessed and directed through the load device 42 until the lithium in the negative electrode 22 is depleted and the capacity of the battery 20 is diminished. While in lithium-ion batteries, lithium intercalates and/or alloys in the electroactive materials. In a lithium-sulfur battery, instead of intercalating or alloying, the lithium dissolves from the negative electrode and migrates to the positive electrode where it reacts/plates during discharge, while during charging, lithium plates on the negative electrode.

The battery 20 can be charged or re-energized at any time by connecting an external power source to the battery 20 to reverse the electrochemical reactions that occur during battery discharge. The connection of the external power source to the battery 20 compels the production of electrons and release of lithium ions from the positive electrode 24. The electrons, which flow back towards the negative electrode 22 through the external circuit 40, and the lithium ions, which are carried by the electrolyte 30 across the separator 26 back towards the negative electrode 22, reunite at the negative electrode 22 and replenish it with lithium for consumption during the next battery discharge cycle. As such, each discharge and charge event is considered to be a cycle, where lithium ions are cycled between the positive electrode 24 and negative electrode 22.

The external power source that may be used to charge the battery 20 may vary depending on the size, construction, and particular end-use of the battery 20. Some notable and exemplary external power sources include an AC wall outlet and a motor vehicle alternator. In many lithium-ion battery configurations, each of the negative current collector 32, the negative electrode 22, the separator 26, the positive electrode 24, and the positive current collector 34 are prepared as relatively thin layers (e.g., from several microns to a millimeter or less in thickness) and assembled in layers connected in electrical parallel arrangement to provide a suitable electrical energy and power package.

Furthermore, the battery 20 can include a variety of other components that, while not depicted here, are nonetheless known to those of skill in the art. For instance, the battery 20 may include a casing, gaskets, terminal caps, tabs, battery terminals, and any other conventional components or materials that may be situated within the battery 20, including between or around the negative electrode 22, the positive electrode 24, and/or the separator 26, by way of example. As noted above, the size and shape of the battery 20 may vary depending on the particular application for which it is designed. Battery-powered vehicles and hand-held consumer electronic devices, for example, are two examples where the battery 20 would most likely be designed to different size, capacity, and power-output specifications. The battery 20 may also be connected in series or parallel with other similar lithium-ion cells or batteries to produce a greater voltage output, energy, and power if it is required by the load device 42.

Accordingly, the battery 20 can generate electric current to a load device 42 that can be operatively connected to the external circuit 40. While the load device 42 may be any number of known electrically-powered devices, a few specific examples of power-consuming load devices include an electric motor for a hybrid vehicle or an all-electric vehicle, a laptop computer, a tablet computer, a cellular phone, and cordless power tools or appliances, by way of example. The load device 42 may also be a power-generating apparatus that charges the battery 20 for purposes of storing energy. In certain other variations, the electrochemical cell may be a supercapacitor, such as a lithium-ion based supercapacitor.

i. Separator

With renewed reference to FIG. 1, the porous separator 26 may include, in certain instances, a microporous polymeric separator including a polyolefin. The polyolefin may be a homopolymer (derived from a single monomer constituent) or a heteropolymer (derived from more than one monomer constituent), which may be either linear or branched. If a heteropolymer is derived from two monomer constituents, the polyolefin may assume any copolymer chain arrangement, including those of a block copolymer or a random copolymer. Similarly, if the polyolefin is a heteropolymer derived from more than two monomer constituents, it may likewise be a block copolymer or a random copolymer. In certain aspects, the polyolefin is polyethylene (PE), polypropylene (PP), blend of PE and PP, or multi-layered structured porous films of PE and/or PP. Commercially available polyolefin porous membranes include CELGARD® 2500 (a monolayer polypropylene separator) and CELGARD® 2320 (a trilayer polypropylene/polyethylene/polypropylene separator) available from Celgard LLC.

The porous separator 26 may be a single layer or a multi-layer laminate when it is a microporous polymeric separator, and may be fabricated from either a dry process or wet process. For example, in one embodiment, a single layer of the polyolefin may form the entire microporous polymer separator 26. In other aspects, the separator 26 may be a fibrous membrane having an abundance of pores extending between the opposing surfaces and may have a thickness of less than a millimeter, for example. As another example, however, multiple discrete layers of similar or dissimilar polyolefins may be assembled to form the microporous polymer separator 26. Furthermore, the porous separator 26 may be mixed with a ceramic material or its surface may be coated in a ceramic material. For example, a ceramic coating may include alumina ($Al_2O_3$), silicon dioxide ($SiO_2$), or combinations thereof. Various conventionally available polymers and commercial products for forming the separator 26 are contemplated, as well as the many manufacturing methods that may be employed to produce such a microporous polymer separator 26.

ii. Positive Electrode

The positive electrode 24 may be formed from a lithium-based active material or a sulfur-based active material that can undergo lithium intercalation and deintercalation, alloying and dealloying, or plating and stripping, while functioning as the positive terminal of the battery 20. Lithium-based active materials for the positive electrode 24 may include one or more transition metals, such as manganese (Mn), nickel (Ni), cobalt (Co), chromium (Cr), iron (Fe), vanadium (V), and combinations thereof. Two exemplary common classes of known electroactive materials that can be used to form the positive electrode 24 are lithium transition metal oxides with layered structures and lithium transition metal oxides with spinel phase. For example, in certain instances, the positive electrode 24 may include a spinel-type transition metal oxide, like lithium manganese oxide ($Li_{(1+x)}Mn_{(2-x)}O_4$), where x is typically <0.15, including $LiMn_2O_4$ (LMO) and lithium manganese nickel oxide $LiMn_{1.5}Ni_{0.5}O_4$ (LMNO). In other instances, the positive electrode 24 may include layered materials like lithium cobalt oxide ($LiCoO_2$), lithium nickel oxide ($LiNiO_2$), a lithium nickel manganese cobalt oxide ($Li(Ni_xMn_yCo_z)O_2$), where $0\le x\le 1$, $0\le y\le 1$, $0\le z\le 1$, and $x+y+z=1$, including $LiMn_{0.33}Ni_{0.33}Co_{0.33}O_2$, a lithium nickel cobalt metal oxide ($LiNi_{(1-x-y)}Co_xM_yO_2$), where $0\le x\le 1$, $0\le y\le 1$ and M may be Al, Mn, or the like. Other known lithium-transition metal compounds such as lithium iron phosphate ($LiFePO_4$) or lithium iron fluorophosphate ($Li_2FePO_4F$) can also be used. In certain aspects, the positive electrode 24 may include an electroactive material that includes manganese, such as lithium manganese oxide ($Li_{(1+x)}Mn_{(2-x)}O_4$), a mixed lithium manganese nickel oxide ($LiMn_{(2-x)}Ni_xO_4$), where $0\le x\le 1$, and/or a lithium manganese nickel cobalt oxide (e.g., $LiMn_{0.33}Ni_{0.33}Co_{0.33}O_2$). In a lithium-sulfur battery, positive electrodes may have elemental sulfur as the active material or a sulfur-containing active material.

In certain variations, such active materials are intermingled with an optional electrically conductive material and/or at least one polymeric binder material. The binder material may structurally fortify the lithium-based active material. For example, the active materials and optional conductive materials may be slurry cast with such binders, like polyvinylidene difluoride (PVdF), ethylene propylene diene monomer (EPDM) rubber, or carboxymethoxyl cellulose (CMC), a nitrile butadiene rubber (NBR), lithium polyacrylate (LiPAA), sodium polyacrylate (NaPAA), sodium alginate, and lithium alginate. Electrically conductive materials may include graphite, carbon-based materials, powdered nickel, metal particles, or a conductive polymer. Carbon-based materials may include particles of: KETCHEN™ black, DENKA™ black, acetylene black, carbon black, and the like. Examples of a conductive polymer include polyaniline, polythiophene, polyacetylene, polypyrrole, and the like. In certain aspects, mixtures of conductive materials may be used.

iii. Negative Electrode

The negative electrode 22 includes an electroactive material as a lithium host material capable of functioning as a negative terminal of a lithium-ion battery. In various aspects, the electroactive material includes lithium and may be lithium metal. The negative electrode 22 may thus include the electroactive lithium host material, such as lithium. In certain variations, the negative electrode 22 may optionally include an electrically conductive material, as well as one or more polymeric binder materials to structurally hold the lithium material together. Negative electrodes may include about 50-100% of an electroactive material (e.g., lithium particles or a lithium foil), and optionally $\le 30\%$ of an electrically conductive material, and a balance of binder. For example, in one embodiment, the negative electrode 22 may include an active material including lithium metal particles intermingled with a binder material selected from the group consisting of: polyvinylidene difluoride (PVdF), ethylene propylene diene monomer (EPDM) rubber, carboxymethoxyl cellulose (CMC), a nitrile butadiene rubber (NBR), lithium polyacrylate (LiPAA), sodium polyacrylate (NaPAA), sodium alginate, lithium alginate, and combinations thereof. Suitable additional electrically conductive materials may include carbon-based material or a conductive polymer. Carbon-based materials may include by way of example, particles of KETCHEN™ black, DENKA™ black, acetylene black, carbon black, and the like. Examples of a conductive polymer include polyaniline, polythiophene, polyacetylene, polypyrrole, and the like. In certain aspects, mixtures of conductive materials may be used.

An electrode may be made by mixing the electroactive material, such as lithium particles, into a slurry with a polymeric binder compound, a non-aqueous solvent, optionally a plasticizer, and optionally if necessary, electrically conductive particles. The slurry can be mixed or agitated, and then thinly applied to a substrate via a doctor blade. The substrate can be a removable substrate or alternatively a functional substrate, such as a current collector (such as a metallic grid or mesh layer) attached to one side of the electrode film. In one variation, heat or radiation can be applied to evaporate the solvent from the electrode film, leaving a solid residue. The electrode film may be further consolidated, where heat and pressure are applied to the film to sinter and calendar it. In other variations, the film may be air-dried at moderate temperature to form self-supporting films. If the substrate is removable, then it is removed from the electrode film that is then further laminated to a current collector. With either type of substrate, it may be necessary to extract or remove the remaining plasticizer prior to incorporation into the battery cell.

In other variations, a negative electrode 22 may be in the form of lithium metal, such as a lithium foil or lithium film. The lithium metal layer may be disposed on the negative current collector 32.

iv. Optional Electrode Surface Coatings

In certain variations, pre-fabricated electrodes formed of electroactive material via the active material slurry casting described above can be directly coated via a vapor coating formation process to form a conformal inorganic-organic composite surface coating, as described further below. Thus, one or more exposed regions of the pre-fabricated negative electrodes comprising the electroactive material can be coated to minimize or prevent reaction of the electrode materials with components within the electrochemical cell to minimize or prevent lithium metal dendrite formation on the surfaces of negative electrode materials when incorporated into the electrochemical cell. In other variations, a plurality of particles comprising an electroactive material, like lithium metal, can be coated with an inorganic-organic composite surface coating. Then, the coated electroactive particles can be used in the active material slurry to form the negative electrode, as described above.

v. Current Collectors

The positive current collector 34 may be formed from aluminum or any other appropriate electrically conductive material known to those of skill in the art. The negative electrode current collector 32 may be formed from copper or any other appropriate electrically conductive material known to those of skill in the art. A negative electrode current collector may be a copper collector foil, which may be in the form of an open mesh grid or a thin film.

vi. Electrolyte Systems

Each of the separator 26, the negative electrode 22, and the positive electrode 24 may include an electrolyte system 30, capable of conducting lithium ions between the negative electrode 22 and the positive electrode 24. In various aspects, the electrolyte system 30 may be a non-aqueous liquid electrolyte solution including a lithium salt and at least one additive compound dissolved in an organic solvent or a mixture of organic solvents. Example organic solvents include ether-based solvents and carbonate-based solvents.

vii. Packaging

A battery may thus be assembled in a laminated cell structure, including a negative electrode layer, a positive electrode layer, and electrolyte/separator between the anode and cathode layers. The negative electrode layer and the positive electrode layer each include a current collector. The current collector can be connected to an external current collector tab. A protective bagging material covers the cell and prevents infiltration of air and moisture. Into this bag, an electrolyte is injected into the separator (and may also be imbibed into the positive and/or negative electrodes) suitable for lithium ion transport. In certain aspects, the laminated battery is further hermetically sealed prior to use.

Electrolytes for Lithium Metal Batteries

As described above, lithium metal anodes are susceptible to lithium deposit growth during operation, which may result in an internal short and ultimately non-functionality of the battery. Therefore, unlike lithium-ion batteries, lithium metal batteries are not well-suited for use with a single liquid or gel electrolyte in combination with a porous separator. Instead, two alternative types of electrolyte systems for lithium metal batteries have been tested: (1) an all-solid system; and (2) a solid-liquid system.

i. All-Solid Electrolyte Systems

The all-solid system includes a solid-state electrolyte (SSE) disposed between a positive electrode and a negative electrode that includes lithium metal. The SSE serves as both an electrolyte and a separator, enabling transfer of lithium ions, while mechanically separating and providing electrical insulation between the electrodes of different polarities. The SSE can be formed from either a ceramic material (e.g., an oxide-based ceramic or a sulfide or oxy-sulfide glass or glass-ceramic) or a polymeric material.

Many ceramic SSEs have high ionic conductivity at room temperature. More specifically, oxide-based ceramics have an ionic conductivity on the order of about 0.1-1 mS/cm at 23° C. Sulfide glasses and glass-ceramics have a conductivity on the order of about 0.1-10 mS/cm at 23° C. Certain ceramic SSEs also have desirable mechanical properties compared to polymeric SSEs. One such property is a high shear modulus, which can reduce the growth of lithium deposits on the negative electrode by providing a mechanical interference. However, some SSEs are nonetheless susceptible to penetration by lithium deposits. For example in cold-compacted sulfide glass SSEs, lithium can plate between particle boundaries on the SSE to form lithium deposits. In another example, lithium can penetrate through sintered oxide SSEs because certain polycrystalline materials are subject to brittle failure. This may result in preferential plating at grain boundaries.

The use of a ceramic SSE in an all-solid system has other potential drawbacks. One drawback is that ceramic SSEs have a high elastic modulus. It may be difficult to maintain surface contact between a rigid SSE and the negative electrode as the surface of the negative electrode becomes uneven due to lithium deposit growth because the inflexibility of the electrolyte prevents it from conforming to the rough surface of the negative electrode. This lack of conformity at the interface between the ceramic SSE and the negative electrode can lead to an undesirable increase of resistance.

Polymeric SSEs are more compliant than ceramic SSEs. Thus, polymeric SSEs are better suited to maintain surface contact with the negative electrode as the surface of the negative electrode becomes rough due to growth of lithium deposits. However, many polymeric SSEs have a lower ionic conductivity of less than 0.01 mS/cm at 23° C., for example. Furthermore, polymeric SSEs have a low shear modulus that is less effective in blocking lithium deposits from growing and reaching the positive electrode. Thus, both ceramic and polymeric SSEs suffer from potential drawbacks that can lead to a low working current density (i.e., lower power).

ii. Solid-Liquid Electrolyte Systems

A solid-liquid system includes an electrolyte system disposed between a positive electrode and a negative electrode. An electrochemical cell incorporating a solid-liquid electrolyte system may be referred to as a "hybrid battery." The electrolyte system typically includes a liquid electrolyte component and a polymeric component (e.g., a "polymer protection layer"). The liquid electrolyte component and the polymeric component may be distinct layers, or they may alternatively be blended. When the components are present as distinct layers, the liquid electrolyte may be disposed adjacent to and between the positive electrode and the polymeric component, which may include one or more layers. The polymeric component may be disposed between the liquid electrolyte and the negative electrode. When the components are blended, the resultant electrolyte system may have a blended gel or composite structure. As described above with respect to the all-solid polymeric SSE, such an interface with the lithium-metal negative electrode may exhibit poor mechanical properties that can fail to sufficiently block the growth of lithium deposits into the positive electrode.

Solid-liquid electrolyte systems for lithium metal electrochemical cells have not typically included sulfide or oxy-sulfide glass or glass-ceramic SSEs due to incompatibility with certain liquid electrolytes, which is described in greater detail below. Due to the aforementioned drawbacks of using a glass or glass-ceramic SSE in direct contact with the lithium metal negative electrode, it may be desirable to use an additional electrolyte between the lithium metal negative electrode and the glass or glass-ceramic SSE. Ether-based electrolytes are advantageously used in lithium metal negative electrodes because they result in higher Columbic efficiency and reduced formation of lithium deposits when compared to carbonate-based electrolytes. In various aspects, ether-based electrolytes are also particularly compatible with sulfur-based cathodes. However, ether-based electrolytes are incompatible with certain ceramic and glass-ceramic SSEs, such as sulfide glass and oxy-sulfide glass SSEs. More particularly, because many ether-based solvents (e.g., dimethoxy ethane, dioxolane) have high dielectric constants compared to carbonate solvents (e.g., 2 times that of common carbonate solvents), they are capable of dissolving materials that would be insoluble in carbonate solvents. More particularly, the high-dielectric-constant electrolyte solvents can readily dissolve cationic species from the SSE (e.g., lithium ions), resulting in the weakly-bonded anionic species sloughing apart and causing the SSE to be drawn into solution.

In various aspects, the present disclosure provides an electrolyte system that includes an aprotic solvent with a dielectric constant of ≥3 (such as an ether-based electrolyte) in communication with a sulfide or oxy-sulfide glass or glass-ceramic electrolyte (also referred to as the "glass electrolyte"). The glass electrolyte is insoluble in the aprotic solvent. The sulfide or oxy-sulfide glass or glass-ceramic electrolyte has a high weighted bond dissociation enthalpy of greater than or equal to about 380 kJ/mol, and optionally greater than or equal to about 400 kJ/mol. The high weighted average bond dissociation enthalpy corresponds to a glass electrolyte composition having individual bonds with high bond dissociation enthalpies. In various aspects, the relatively high weighted bond dissociation enthalpy is believed to contribute to the stability of the glass electrolyte in the presence of a high-dielectric-constant liquid electrolyte (e.g., ether-based electrolyte).

Electrolyte systems including glass electrolytes according to certain aspects of the present disclosure can advantageously be used in electrochemical cells. In a lithium metal battery, the glass electrolyte may mechanically reduce or prevent lithium deposit growth and improve abuse tolerance and durability. In a lithium-sulfur battery, the aprotic solvent can maintain good contact between the solid component and the negative electrode, resulting in desirably low resistance. As such, the electrolyte systems including the insoluble glass electrolyte and the aprotic solvent can enable advanced battery chemistries capable of >350 Wh/kg. These battery chemistries can include lithium metal negative electrodes, such as in lithium-sulfur cells and lithium-air cells.

Sulfide and Oxy-Sulfide Glasses and Glass-Ceramics

Sulfide and oxy-sulfide glasses are formed by combining at least two types of materials: one or more glass formers and one or more glass modifiers. The glass former and the glass modifier may be collectively referred to as a glass forming system. In various aspects, when two glass formers are used, they may be referred to as a glass former and a glass co-former. The sulfide or oxy-sulfide glass formation may optionally include combining a dopant with the glass former/s and glass modifier/s. For a sulfide glass, both the glass former and the glass modifier include sulfur. An oxy-sulfide glass can include (i): an oxide forming system (e.g., an oxide-containing glass former and an oxide-containing glass modifier) with a sulfide co-former; (ii) a sulfide forming system (e.g., a sulfide-containing glass former and a sulfide-containing glass modifier) with an oxide co-former; (iii) a sulfide forming system with an oxide co-modifier, (iv) an oxide forming system with a sulfide co-modifier.

The glass former and glass co-former may each include a glass-forming sulfide or oxide. Glass forming sulfides include: $P_2S_5$, $SnS_2$, $GeS_2$, $B_2S_3$, $SiS_2$, and combinations thereof, by way of example. Glass-forming oxides include $SiO_2$, $GeO_2$, $P_2O_5$, $B_2O_3$, $Al_2O_3$, and combinations thereof, by way of example. The glass modifier and glass co-modifier can each also include a sulfide or oxide. Sulfide-containing glass modifiers include $Li_2S$, $Na_2S$, and combinations thereof, by way of example. Oxide-containing glass modifiers include $Li_2O$, $Na_2O$, and combinations thereof, by way of example. For use in batteries with lithium-containing negative electrodes, the glass modifier may include lithium (e.g., $Li_2S$, $Li_2O$). For use in batteries with sodium-containing negative electrodes, the glass modifier may include sodium (e.g., $Na_2S$, $Na_2O$). To support advantageous electrolytic activity, at least one of the glass former and the glass modifier may contain sulfur. The dopant can be used to improve glass formability, ionic conductivity, and/or stability. For example, LiI can be added as a dopant to increase lithium ion conductivity by increasing the amount of free lithium ions in the network. In various aspects, the dopant includes: LiI, $Li_3PO_4$, $Li_4SiO_4$, LiCl, and combinations thereof.

The constituent precursors—namely, the glass former/s and the glass modifier/s—react to form a sulfide or oxy-sulfide glass that enables the formation of mobile alkali metal cations. For convenience, the sulfide and oxy-sulfide glass compositions detailed herein will be described in terms of the atomic proportions of their glass forming system constituents. However, when reacted, the constituent precursors will form glasses having anchored tetrahedral anions with mobile lithium (or sodium) ions. For example, a glass that is formed from 70 mole percent $Li_2S$ glass modifier and 30 mole percent $P_2S_5$ glass former may be described as $70Li_2S$-$30P_2S_5$, and have composition $Li_7P_3S_{11}$ when formed. The glass may include anchored phosphorus sulfide tetrahedral anion structural units ($PS_4^{3-}$) and mobile lithium ions ($Li^+$). As used herein, formulas representing atomic proportion of constituents (e.g., $70Li_2S$-$30P_2S_5$) will be referred to as "empirical formulas," even though they can be further simplified (e.g., $Li_7P_3S_{11}$). Notably, the empirical formulas describe relative proportions of atoms, but do not describe arrangement of atoms or and may not describe quantity of atoms.

Insoluble Sulfide and Oxy-Sulfide Glass and Glass-Ceramic Electrolytes

As discussed above, typical sulfide and oxy-sulfide glasses can be dissolved in high-dielectric-constant aprotic solvents (e.g., dielectric constants ≥3), such as ether-based solvents. However, certain sulfide or oxy-sulfide glass compositions are stable enough to be insoluble in these solvents. A calculated weighted average bond dissociation enthalpy ($BDE_{WA}$), discussed in greater detail below, provides an estimate of the stability of a particular sulfide or oxy-sulfide glass composition. In general, compositions having higher $BDE_{WA}$ values are more stable in high-dielectric-constant aprotic solvents and therefore less likely to dissolve in the high-dielectric-constant aprotic solvent.

Several other factors in addition to high $BDE_{WA}$ may be considered in identifying suitable sulfide or oxy-sulfide glass compositions for electrolytes. Relevant considerations include: (1) stability toward lithium; (2) desirable mechanical properties; (3) ionic conductivity; (4) melt volatility; and (5) glass formability. As to consideration (1), sulfide glasses are generally not thermodynamically stable versus lithium metal. However, some glass compositions are more kinetically stable versus lithium than others. For example, $Li_2S$—$P_2S_5$—$P_2O_5$ is kinetically stable as compared to lithium metal because the glass reacts with lithium to form a passivating layer of $Li_2S$, $Li_2O$ and $Li_3P$. After these compounds form, no further degradation of the glass takes place and it is functionally stable. With respect to consideration (2), desirable mechanical properties may include high stiffness and high strength. As to consideration (3), a composition may be considered to be ionically conductive when its conductivity is greater than or equal to about 0.01 mS/cm. In various aspects, sulfide or oxy-sulfide glass electrolytes may be ionically conductive, electrically insulating, and have a high $BDE_{WA}$ (e.g., $BDE_{WA}$≥380 kJ/mol). Consideration (4) may be important when glasses are formed via melt forming processes. Glass melts can be volatile, resulting in a loss of mass. Glasses having high volatility may be less desirable than glasses having low volatility. In a melt forming process, volatile glass melts may lose mass, leading to difficulty in maintaining the correct composition. Furthermore, the volatized products may be corrosive and damage processing equipment. Finally, consideration (5) refers to glasses that form at practical quench rates.

i. Composition

A sulfide or oxy-sulfide glass may have the empirical composition $N_M$(M)-$N_F$(F)—$N_C$(C)—$N_D$, where M represents a glass modifier, F represents a glass former, C represents an optional glass co-former or glass co-modifier, and D represents an optional dopant. One skilled in the art will appreciate that, although the equation references a single optional co-former or co-modifier, the glass may alternatively include both a co-former and a co-modifier, multiple co-formers and/or co-modifiers, or omit co-formers and co-modifiers altogether. Likewise, the dopant may be omitted. $N_M$, $N_F$, $N_C$, and $N_D$ represent atomic proportions of the glass modifier, glass former, glass co-former or co-modifier, and dopant respectively. The sulfide or oxy-sulfide glass may alternatively be described as $n_M$(M)-$n_F$(F)-$n_C$(C)-$n_D$(D), where $n_M$, $n_F$, $n_C$, and $n_D$ represent mole fractions of the glass modifier, glass former, glass co-former or co-modifier, and dopant respectively. Therefore:

$$n_M = \frac{N_M}{N_M + N_F + N_C + N_D} \quad \text{(eqn. 1)}$$

$$n_F = \frac{N_F}{N_M + N_F + N_C + N_D} \quad \text{(eqn. 2)}$$

$$n_C = \frac{N_C}{N_M + N_F + N_C + N_D} \quad \text{(eqn. 3)}$$

$$n_D = \frac{N_D}{N_M + N_F + N_C + N_D} \quad \text{(eqn. 4)}$$

By way of example, when the sulfide or oxy-sulfide glass is a sulfide glass having the empirical formula $70Li_2S$-$30P_2S_5$, M is $Li_2S$, $N_M$=70, $n_M$=0.7, F is $P_2S_5$, $N_F$=30, $n_F$=0.3, $N_C$=0 $n_C$=0, $N_D$=0, and $n_D$=0.

In the sulfide or oxy-sulfide glass composition, $n_M$(M)-$n_F$(F)-$n_C$(C)-$n_D$(D), $n_M$>0, $n_F$>0, $n_C$≥0, and $n_D$≥0. Therefore, although the formula includes C and D, the glass co-former or co-modifier and dopant are both optional and may be omitted as noted above. When $n_C$=0 and $n_D$=0, the sulfide or oxy-sulfide glass can also be described as $n_M$(M)-$n_F$(F). In various aspects, $n_M$+$n_F$+$n_C$+$n_D$=1.

M, F, C, and D may be any suitable glass modifier, glass former, glass co-former or co-modifier, and dopant known to those skilled in the art. Thus, M, F, C, and D are not limited to the compositions described below. M may be a glass modifier including a sulfide or an oxide. The glass modifier may be selected from the group consisting of: $Li_2S$, $Na_2S$, $Li_2O$, $Na_2O$, and combinations thereof. In various aspects, the glass modifier is selected from the group consisting of: $Li_2S$, $Li_2O$, and combinations thereof. In still other aspects, the glass modifier is $Li_2S$. F may be a glass former including a glass forming sulfide or oxide. The glass former may be selected from the group consisting of: $P_2S_5$, $SnS_2$, $SiO_2$, $GeO_2$, $GeS_2$, $B_2S_3$, $P_2O_5$, $SiS_2$, $B_2O_3$, $Al_2O_3$, and combinations thereof. In various aspects, the glass former is selected from the group consisting of: $GeS_2$, $B_2S_3$, $P_2O_5$, $SiS_2$, $B_2O_3$, $Al_2O_2$, and combinations thereof. In yet other aspects, the glass former is selected from the group consisting of: $SiS_2$, $B_2O_3$, and combinations thereof. C may optionally be omitted. However, when a glass co-former is used, the glass co-former may include another glass-forming sulfide or oxide, such as those discussed above. When a glass co-modifier is used, the glass co-modifier may include another sulfide or oxide, such as those discussed above. D may optionally be omitted. In various aspects, the sulfide or oxy-sulfide glass may include a dopant that is selected from the group consisting of: LiI, $Li_3PO_4$, $Li_4SiO_4$, LiCl, and combinations thereof. One skilled in the art will appreciate that the glass compositions described herein can optionally be partially or completely devitrified to form a glass-ceramics or ceramics having a crystalline phase with long-range crystallographic order (e.g., $70Li_2S$-$30P_2S_5$ glass is devitrified to form the $Li_7P_3S_{11}$ phase; or $75Li_2S$-$25P_2S_5$ glass is devitrified to form the beta-$Li_3PS_4$ phase).

ii. Calculating Weighted Average Bond Dissociation Enthalpy

In certain variations, the glass electrolyte has a $BDE_{WA}$ of greater than or equal to about 380 kJ/mol, optionally greater than or equal to about 385 kJ/mol, optionally greater than or equal to about 390 kJ/mol, optionally greater than or equal to about 395 kJ/mol, optionally greater than or equal to about 400 kJ/mol, optionally greater than or equal to about 405 kJ/mol, optionally greater than or equal to about 410 kJ/mol, optionally greater than or equal to about 415 kJ/mol, optionally greater than or equal to about 420 kJ/mol, optionally greater than or equal to about 425 kJ/mol, optionally greater than or equal to about 430 kJ/mol, optionally greater than or equal to about 435 kJ/mol, optionally greater than or equal to about 440 kJ/mol, optionally greater than or equal to about 445 kJ/mol, optionally greater than or equal to about 450 kJ/mol, optionally greater than or equal to about 455 kJ/mol, optionally greater than or equal to about 460 kJ/mol, optionally greater than or equal to about 465 kJ/mol, and optionally greater than or equal to about 470 kJ/mol.

As noted above, the $BDE_{WA}$ is used to predict the stability (i.e., the tendency to remain undissolved while in direct communication with the solvent) of a sulfide or oxy-sulfide glass or glass-ceramic in electrolyte high-dielectric-constant aprotic solvent such as an ether-based solvent. The $BDE_{WA}$ is dependent upon bond dissociation enthalpies (BDEs), also referred to as bond dissociation energies, of the different types of bonds in the glass electrolyte. The different types of bonds may be identified based on the compositions of the constituent glass modifier, former, and optional co-former or co-modifier. The $BDE_{WA}$ takes into account the relative molar amounts of the different types of bonds, as estimated by the relative molar amounts of each of the glass modifier, former, co-former or co-modifier, and dopant.

Each glass modifier, former, co-former or co-modifier, and dopant may have a corresponding BDE to be used in determining the $BDE_{WA}$ for the sulfide or oxy-sulfide glass. Many glass modifiers, formers, co-formers, co-modifiers, and dopants are binary compounds (i.e., compounds made up of two different elements or constituents). For the purpose of the $BDE_{WA}$ calculation, the BDE associated with each glass modifier, former, co-former or co-modifier, and dopant is a BDE of a single bond between the two unique elements or constituents of the glass modifier, former, co-former co-modifier, or dopant. For example, for a $Li_2S$ glass modifier, the BDE for a single Li—S bond is used in the $BDE_{WA}$ calculation. As another example, for a $GeS_2$ glass former, the BDE for a single Ge—S bond is used in the $BDE_{WA}$ calculation. Although prior to being reacted to form the sulfide or oxy-sulfide glass, many of the glass formers and co-formers discussed herein include double bonds, most or all of the bonds in the resulting sulfide or oxy-sulfide glass are single bonds. Therefore, BDEs for single bonds are used in the $BDE_{WA}$ calculation.

The $BDE_{WA}$ calculation also takes into account the relative quantity of sulfur, oxygen, iodine, or chlorine bonds that each constituent contributes to the glass electrolyte when the tetrahedral structure is formed. In one example, $Li_2S$ has a weight of 2 because it contributes two Li—S polar covalent bonds to the glass electrolyte. In another example, $SiS_2$ has a weight of 4 because the silicon atom forms a tetrahedral structure with four sulfur atoms, resulting in four Si—S bonds in the glass electrolyte structure. In yet another example, $P_2S_5$ has a weight of 8 because each of the two phosphorous atoms forms a tetrahedral structure with four sulfur atoms, resulting in eight total P—S bonds. In yet another example, $GeO_2$ has a weight of 4 because the germanium atom forms a tetrahedral structure with four oxygen atoms, resulting in four Ge—O bonds in the glass electrolyte structure. In yet another example, LiI has a weight of 1 because it contributes one Li—I bond to the glass electrolyte. In yet another example, $LiPO_4$ has a weight of 4 because the phosphorous atom forms a tetrahedral structure with four oxygen atoms, resulting in four P—O bonds in the glass electrolyte structure. In yet another example, $LiSiO_4$ has a weight of 4 because the silicon atom forms a tetrahedral structure with four oxygen atoms, resulting in four Si—O bonds in the glass electrolyte structure.

BDEs and weights (w) for various glass modifiers and co-modifiers are shown in Table 1, below. BDEs and ws for various glass formers and co-formers are shown in Table 2, below. BDEs and ws for various dopants are shown in Table 3, below.

TABLE 1

| Glass Modifier | Type of Bond | Bond Dissociation Enthalpy (BDE) (kJ/mol) | Weight (w) |
| --- | --- | --- | --- |
| $Li_2S$ | Li—S | 312 | 2 |
| $Li_2O$ | Li—O | 341 | 2 |
| $Na_2O$ | Na—O | 257 | 2 |

TABLE 2

| Glass Former | Type of Bond | Bond Dissociation Enthalpy (BDE) (kJ/mol) | Weight (w) |
| --- | --- | --- | --- |
| $P_2S_5$ | P—S | 346 | 8 |
| $SnS_2$ | Sn—S | 467 | 4 |
| $GeS_2$ | Ge—S | 551 | 4 |
| $B_2S_3$ | B—S | 581 | 8 |
| $SiS_2$ | Si—S | 619 | 4 |
| $SiO_2$ | Si—O | 452 | 4 |
| $GeO_2$ | Ge—O | 657 | 4 |
| $P_2O_5$ | P—O | 597 | 8 |
| $B_2O_3$ | B—O | 806 | 8 |
| $Al_2O_3$ | Al—O | 512 | 8 |

TABLE 3

| Dopant | Type of Bond | Bond Dissociation Enthalpy (BDE) (kJ/mol) | Weight (w) |
|---|---|---|---|
| LiI | Li—I | 345 | 1 |
| LiCl | Li—Cl | 369 | 1 |

The $BDE_{WA}$ for a particular sulfide or oxy-sulfide glass is calculated according to Equation 5 below:

$$BDE_{WA} = \frac{w_M n_M BDE_M}{w_M n_M + w_F n_F + w_C n_C + w_D n_D} + \frac{w_F n_F BDE_F}{w_M n_M + w_F n_F + w_C n_C + w_D n_D} + \frac{w_C n_C BDE_C}{w_M n_M + w_F n_F + w_C n_C + w_D n_D} + \frac{w_D n_D BDE_D}{w_M n_M + w_F n_F + w_C n_C + w_D n_D},$$ (eqn. 5)

where $BDE_M$ is a bond dissociation enthalpy required to break a single bond of distinct constituents of M, $BDE_F$ is a bond dissociation enthalpy required to break a single bond of distinct constituents of F, $BDE_C$ is a bond dissociation enthalpy required to break a single bond of distinct constituents of C, $BDE_D$ is a bond dissociation enthalpy required to break a single bond of distinct constituents of D, $w_M$ is a quantity of sulfur or oxygen bonds that M contributes to the sulfide or oxy-sulfide glass or glass-ceramic electrolyte, $w_F$ is a quantity of sulfur or oxygen bonds that F contributes to the sulfide or oxy-sulfide glass or glass-ceramic electrolyte, we is a quantity of sulfur or oxygen bonds that C contributes to the sulfide or oxy-sulfide, and $w_D$ is a quantity of sulfur, oxygen, iodine, or chlorine bonds that D contributes to the sulfide or oxy-sulfide glass or glass-ceramic electrolyte glass or glass-ceramic electrolyte. In alternative aspects, the $BDE_{WA}$ may be calculated using volume fractions of the glass modifier, glass former, glass co-former or co-modifier, and dopant instead of the mole fractions.

In general, a glass electrolyte having a significant quantity (as estimated by the mole or volume fraction of the constituent molecules) of stronger bonds will yield a higher $BDE_{WA}$. Strong bonds may be those having BDEs of greater than or equal to about 500 kJ/mol, optionally greater than or equal to about 550 kJ/mol, optionally greater than or equal to about 600 kJ/mol, optionally greater than or equal to about 650 kJ/mol, optionally greater than or equal to about 700 kJ/mol, optionally greater than or equal to about 750 kJ/mol, and optionally greater than or equal to about 800 kJ/mol. Thus, a sulfide or oxy-sulfide glass that is formed by reacting significant amounts of $GeS_2$, $B_2S_3$, $SiS_2$, $GeO_2$, $P_2O_5$, and $Al_2O_3$ may have high $BDE_{WA}$. However, one skilled in the art will appreciate that any combination of glass modifier/s, glass former/s, optional glass co-former/s and/or co-modifiers, and optional dopants that results in a high $BDE_{WA}$ (e.g., ≥380 kJ/mol) may be stable in high-dielectric-constant aprotic solvent.

Sample Calculation

The $BDE_{WA}$ for $70Li_2S-30P_2S_5$ is calculated below as an example. $70Li_2S-30P_2S_5$ is formed using $Li_2S$ as a glass modifier and $P_2S_5$ as a glass former, and omitting a glass co-former/co-modifier and a dopant. The mole fraction of glass modifier $(n_M)$ is $70/(30+70)=0.7$. The mole fraction of the glass former $(n_F)$ is $30/(70+30)=0.3$. The glass modifier is made up of lithium and sulfur as unique constituents. Therefore, the $BDE_{WA}$ calculation uses the BDE for a lithium-sulfur single bond. Per Table 1 above, $BDE_{Li-S}=312$ kJ/mol. $Li_2S$ contributes two Li—S bonds to the glass structures, so w=2. The glass former is made up of phosphorous and sulfur as unique constituents. Therefore, the $BDE_{WA}$ calculation uses the BDE for a phosphorous-sulfur single bond. Per Table 2, $BDE_{P-S}=346$ kJ/mol. $P_2S_5$ contributes eight P—S bonds to the glass structure, so w=8. For the sulfide glass $70Li_2S-30P_2S_5$, the $BDE_{WA}=335.5$ kJ/mol. Table 4 includes the calculated $BDE_{WA}$ for nine sulfide or oxy-sulfide glasses as examples.

TABLE 4

| Sulfide or Oxy-Sulfide Glass | $BDE_{WA}$ (kJ/mol) |
|---|---|
| $50Li_2S-45SiS_2-5GeO_2$ | 519.2 |
| $50Li_2S-45GeS_2-5GeO_2$ | 478.4 |
| $57Li_2S-35SiS_2-8P_2S_5$ | 454.0 |
| $53.6Li_2S-32.9SiS_2-7.5P_2S_5-6LiI$ | 452.7 |
| $60Li_2S-32SiS_2-8P_2S_5$ | 444.9 |
| $60Li_2S-30SiS_2-10P_2S_5$ | 435.6 |
| $70Li_2S-20P_2S_5-10P_2O_5$ | 386.3 |
| $70Li_2S-25P_2S_5-5P_2O_5$ | 359.9 |
| $70Li_2S-30P_2S_5$ | 333.5 |

The molar amounts of each constituent in a sulfide or oxy-sulfide composition can be varied so that three requirements are met: (1) a glass is formed; (2) the glass is ionically conductive (e.g., ≥0.01 mS/cm at 23° C.), and (3) the glass has a high enough $BDE_{WA}$ to be insoluble in ether-based solvent (e.g., ≥400 kJ/mol). Three example glass-forming systems are described below.

$Li_2S-P_2S_5-SiS_2$ System

Figure 2A:
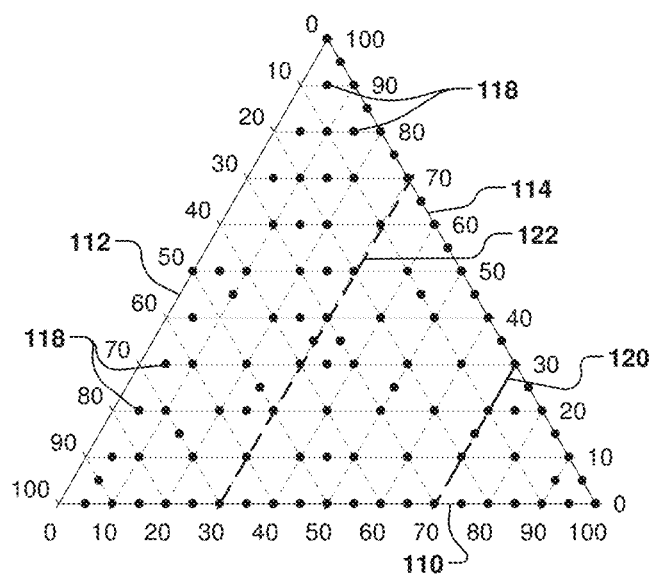
Figure 2B:
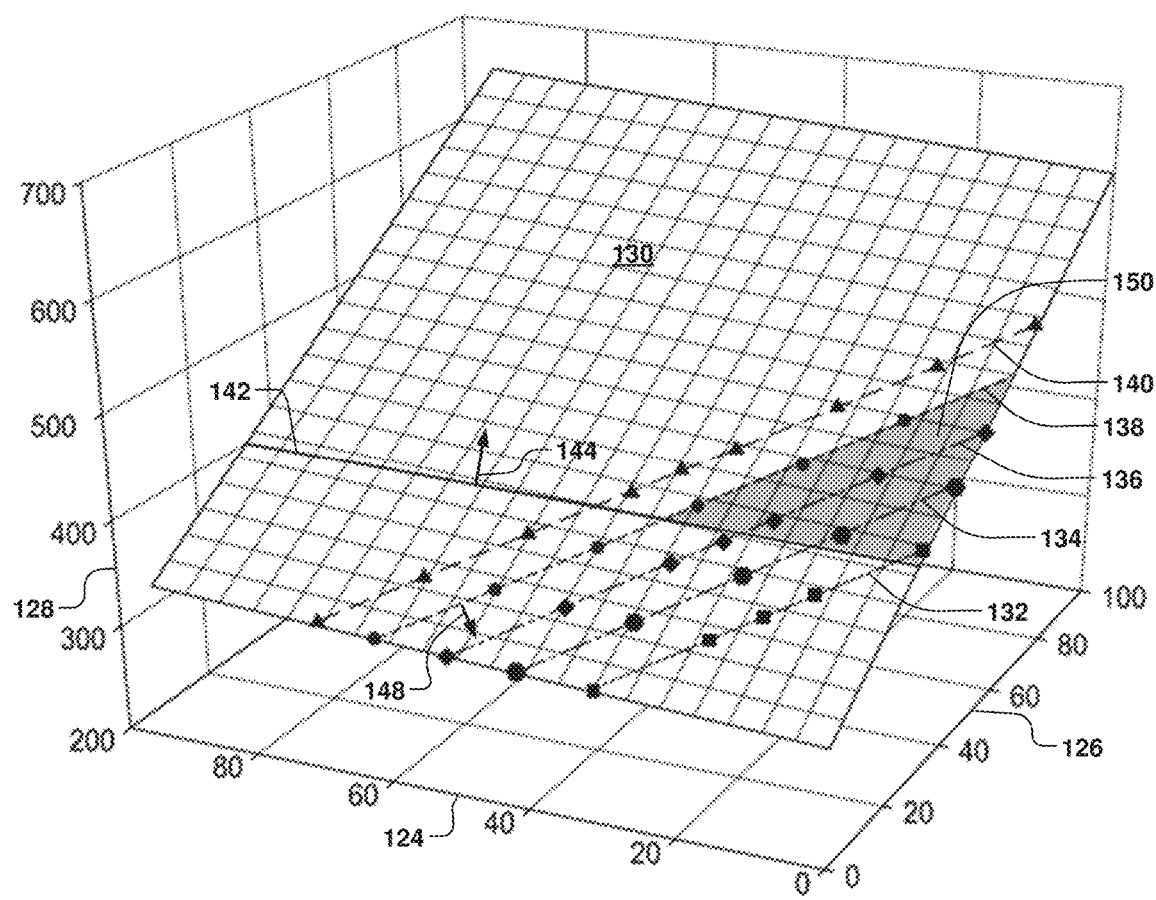

Referring to FIGS. 2A-2B, a $Li_2S-P_2S_5-SiS_2$ system according to various aspects of the present disclosure is provided, where $Li_2S$ is a glass modifier, and $P_2S_5$ and $SiS_2$ are glass formers (also referred to as a glass former and co-former). FIG. 2A is a ternary diagram of the $Li_2S-P_2S_5-SiS_2$ system. A first axis 110 represents mole percent $Li_2S$. A second axis 112 represents mole percent $P_2S_5$. A third axis 114 represents mole percent $SiS_2$. The data points 118 represent example $Li_2S-P_2S_5-SiS_2$ compositions. A first line 120 represents a 70% $Li_2S$ isopleth. A second line 122 represents a 30% $Li_2S$ isopleth.

FIG. 2B shows $BDE_{WA}$ as a function of the mole percentages of the glass-forming constituents (the glass modifier, former, and co-former). A first axis 124 represents mole percent $P_2S_5$. A second axis 126 represents mole percent $SiS_2$. The $Li_2S$ content can be determined based on FIG. 2A. A third axis 128 represents $BDE_{WA}$ in kJ/mol. A surface 130 shows $BDE_{WA}$ as a function of mole percent $P_2S_5$ and $SiS_2$. A first isopleth 132 corresponds to 70% $Li_2S$. A second isopleth 134 corresponds to 60% $Li_2S$. A third isopleth 136 corresponds to 50% $Li_2S$. A fourth isopleth 138 corresponds to 40% $Li_2S$. A fifth isopleth 140 corresponds to 30% $Li_2S$.

The line 142 represents $BDE_{WA}=400$ kJ/mol. Compositions having BDE≥400 kJ/mol are believed to be stable enough to remain undissolved in the presence of an aprotic solvent with a dielectric constant of ≥3 (e.g., an ether-based electrolyte), as represented by the first arrow 144. Compositions having at least 40% $Li_2S$ are believed to be ionically conductive. The threshold for ionic conductivity (e.g., 40% $Li_2S$ for the $Li_2S$—$P_2S_5$—$SiS_2$ system) is known in the art and/or determined experimentally. Increasing ionic conductivity is represented by a second arrow 148. An area 150 encompasses compositions that are believed to be stable and ionically conductive. Compounds within the area 150 that form glasses may therefore be suitable for use in an electrolyte system including high-dielectric-constant aprotic solvent for an electrochemical cell. In various aspects, a sulfide glass may be formed from $P_2S_5$ and $SiS_2$ glass formers and a $Li_2S$ glass modifier present at ≥40%.

$Li_2S$—$P_2O_5$—$P_2S_5$ System

Figures 3A, 3B:
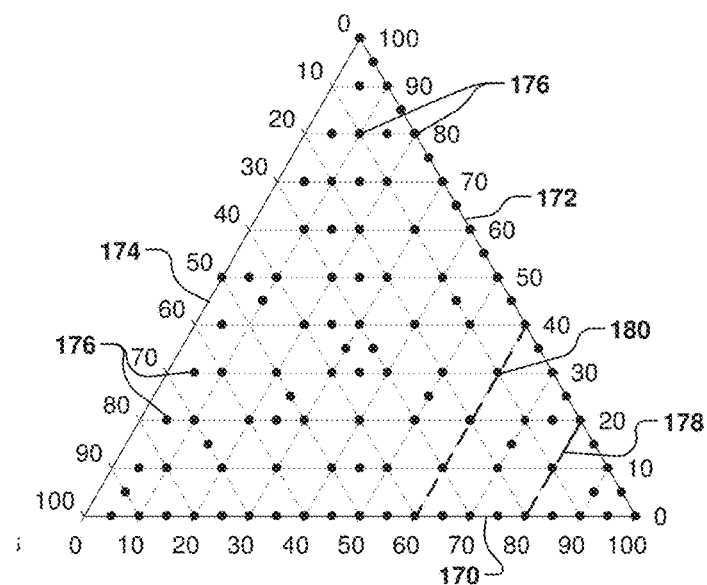

Referring to FIGS. 3A-3B, a $Li_2S$—$P_2O_5$—$P_2S_5$ system according to various aspects of the present disclosure is provided, where $Li_2S$ is a glass modifier, and $P_2O_5$ and $P_2S_5$ are a glass former and co-former. FIG. 3A is a ternary diagram of the $Li_2S$—$P_2O_5$—$P_2S_5$ system. A first axis 170 represents mole percent $Li_2S$. A second axis 172 represents mole percent $P_2O_5$. A third axis 174 represents mole percent $P_2S_5$. The data points 176 represent example $Li_2S$—$P_2O_5$—$P_2S_5$ compositions. A first line 178 represents an 80% $Li_2S$ isopleth. A second line 180 represents a 60% $Li_2S$ isopleth.

FIG. 3B shows $BDE_{WA}$ as a function of the mole percentages of the glass-forming constituents (the glass modifier, the glass former, and the glass co-former). A first axis 182 represents mole percent $P_2O_5$. A second axis 184 represents mole percent $P_2S_5$. The $Li_2S$ content can be determined based on FIG. 3A. A third axis 186 represents $BDE_{WA}$ in kJ/mol. A surface 190 shows $BDE_{WA}$ as a function of mole percent $P_2O_5$ and $P_2S_5$. A first isopleth 192 corresponds to 80% $Li_2S$. A second isopleth 194 corresponds to 70% $Li_2S$. A third isopleth 196 corresponds to 60% $Li_2S$.

The line 202 represents $BDE_{WA}$=400 kJ/mol. Compositions having BDE≥400 kJ/mol are believed to be stable enough to remain undissolved in the presence of an aprotic solvent with a dielectric constant ≥3 (e.g., an ether-based electrolyte), as represented by the first arrow 204. Compositions having at least 70% (or slightly less) $Li_2S$ are ionically conductive. Increasing ionic conductivity is represented by a second arrow 206. For this $Li_2S$—$P_2O_5$—$P_2S_5$ system, no compositions are both ionically conductive and have a $BDE_{WA}$≥400 kJ/mol.

$Li_2S$—$P_2S_5$—$B_2O_3$ System

Figure 4A:
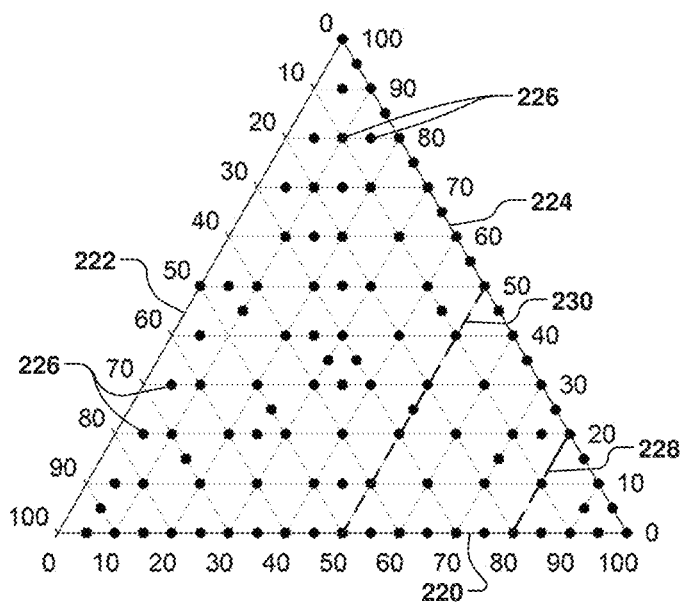
Figure 4B:
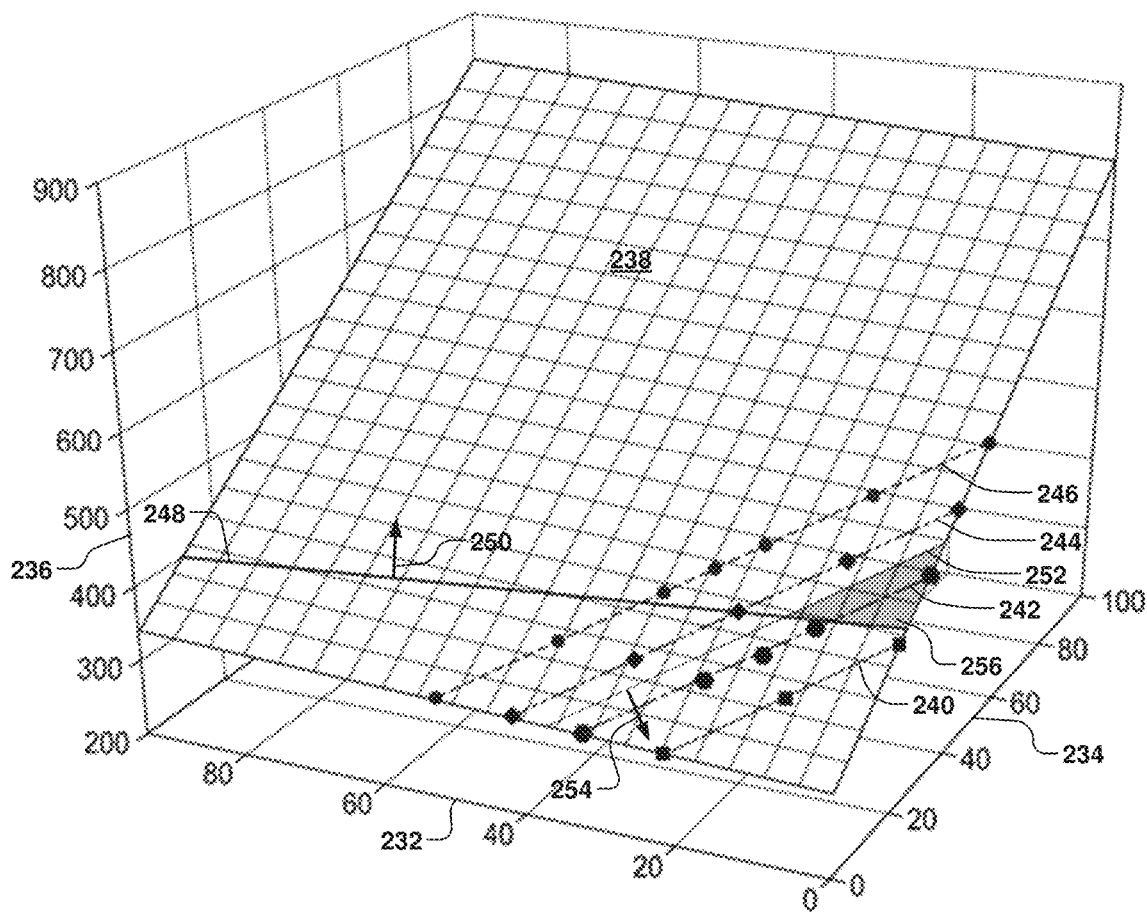

Referring to FIGS. 4A-4B, a $Li_2S$—$P_2S_5$—$B_2O_3$ system according to various aspects of the present disclosure is provided, where $Li_2S$ is a glass modifier, and $P_2S_5$ and $B_2O_3$ are a glass former and co-former. FIG. 4A is a ternary diagram of the $Li_2S$—$P_2S_5$—$B_2O_3$ system. A first axis 220 represents mole percent $Li_2S$. A second axis 222 represents mole percent $P_2S_5$. A third axis 224 represents mole percent $B_2O_3$. The data points 226 represent example $Li_2S$—$P_2S_5$—$B_2O_3$ compositions. A first line 228 represents an 80% $Li_2S$ isopleth. A second line 230 represents a 50% $Li_2S$ isopleth.

FIG. 4B shows $BDE_{WA}$ as a function of the mole percentages of the glass-forming constituents (the glass modifier, the glass former, and the glass co-former). A first axis 232 represents mole percent $P_2S_5$. A second axis 234 represents mole percent $B_2O_3$. A third axis 236 represents $BDE_{WA}$ in kJ/mol. A surface 238 shows $BDE_{WA}$ as a function of mole percent $P_2S_5$ and $B_2O_3$. A first isopleth 240 corresponds to 80% $Li_2S$. A second isopleth 242 corresponds to 70% $Li_2S$. A third isopleth 244 corresponds to 60% $Li_2S$. A fourth isopleth 246 corresponds to 50% $Li_2S$.

The line 248 represents $BDE_{WA}$=400 kJ/mol. Compositions having BDE≥400 kJ/mol are believed to be stable enough to remain undissolved in the presence of an aprotic solvent with a dielectric constant of ≥3 (e.g., an ether-based electrolyte), as represented by the first arrow 250. Compositions having at least 65% $Li_2S$, as shown by a fifth isopleth 252, are ionically conductive. Increasing ionic conductivity is represented by a second arrow 254. An area 256 encompasses compositions that are believed to be stable and ionically conductive. Compounds within the area 256 that form glasses may therefore be suitable for use in an electrolyte system including electrolyte high-dielectric-constant aprotic solvent for an electrochemical cell. In various aspects, a sulfide glass may be formed from $P_2S_5$ and $B_2O_3$ glass formers and a $Li_2S$ glass modifier present at ≥65%.

Electrochemical Cells Including Insoluble Sulfide and Oxy-Sulfide Glasses

Figure 5:
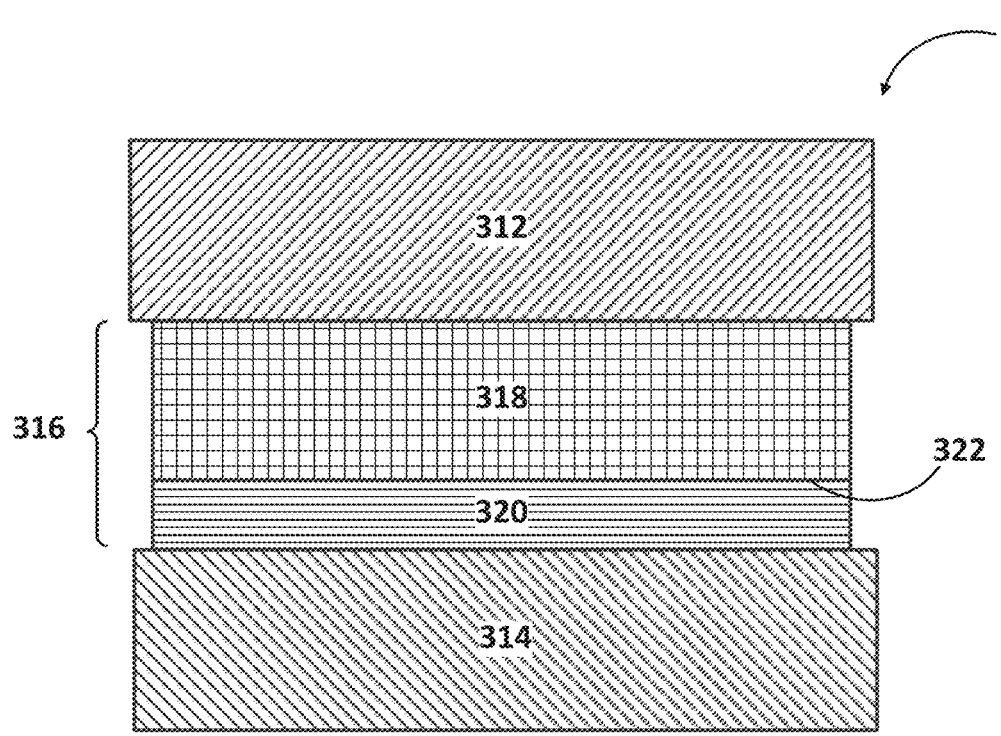
FIG. 5 shows an electrochemical cell including an electrolyte system according to various aspects of the present disclosure.

Referring to FIG. 5, an electrochemical cell 310 according to various aspects of the present disclosure is provided. The electrochemical cell 310 may include a positive electrode 312 (i.e., cathode), a negative electrode 314 (i.e., anode), and an electrolyte system 316. The positive and negative electrodes 312, 314 may include any of the materials discussed above. In various aspects, the negative electrode 314 includes lithium metal and the electrochemical cell 310 is a lithium-sulfur cell or a lithium-air cell.

The electrolyte system 316 may be disposed between the positive electrode 312 and the negative electrode 314. The electrolyte system 316 may include a solid component 318 and a high-dielectric-constant aprotic electrolyte 320, which may be in the form of a liquid or gel. The electrolyte 320 may include a solvent that has a dielectric constant of ≥3, optionally ≥4, optionally ≥5, optionally ≥6, optionally ≥7, and optionally ≥8. In various aspects, the solvent may be an ether or ether-based.

The electrolyte 320 having the high-dielectric-constant aprotic solvent may be disposed between the solid component 318 and the negative electrode 314. The electrolyte 320 having the high-dielectric-constant aprotic solvent may be in direct communication with the solid component 318. More particularly, the electrolyte 320 having the high-dielectric-constant aprotic solvent may be in direct contact with a surface 322 of the solid component 318.

The solid component 318 may include a sulfide or oxy-sulfide glass or glass-ceramic such as those discussed above. For example, the sulfide or oxy-sulfide glass or glass-ceramic may be ionically conductive and have a $BDE_{WA}$≥380 kJ/mol. The electrolyte 320 may include the having the high-dielectric-constant aprotic solvent and a salt. The solvent may be an ether solvent selected from the group consisting of: 1,3-dioxolane (DOL), dimethoxyethane (DME), tetrahydrofuran, 2-methyltetrahydrofuran, 1,2-diethoxyethane, ethoxymethoxyethane, tetraethylene glycol dimethyl ether (TEGDME), polyethylene glycol dimethyl ether (PEGDME), and admixtures thereof. The salt may be a lithium salt selected from the group consisting of: $LiN(CF_3SO_2)_2$, LiTFSI, $LiNO_3$, $LiPF_6$, $LiBF_4$, LiI, LiBr, LiSCN, $LiClO_4$, $LiAlCl_4$, $LiB(C_2O_4)_2$ (LiBOB), $LiB(C_6H5)_4$, $LiBF_2(C_2O_4)$ (LiODFB), $LiN(SO_2F)_2$ (LiFSI), $LiPF_3(C_2F_5)_3$ (LiFAP), $LiPF_4(CF_3)_2$, $LiPF_4(C_2O_4)$ (LiFOP), $LiPF_3(CF_3)_3$, $LiSO_3CF_3$, $LiCF_3SO_3$, $LiAsF_6$, and combinations thereof.

Figure 6:
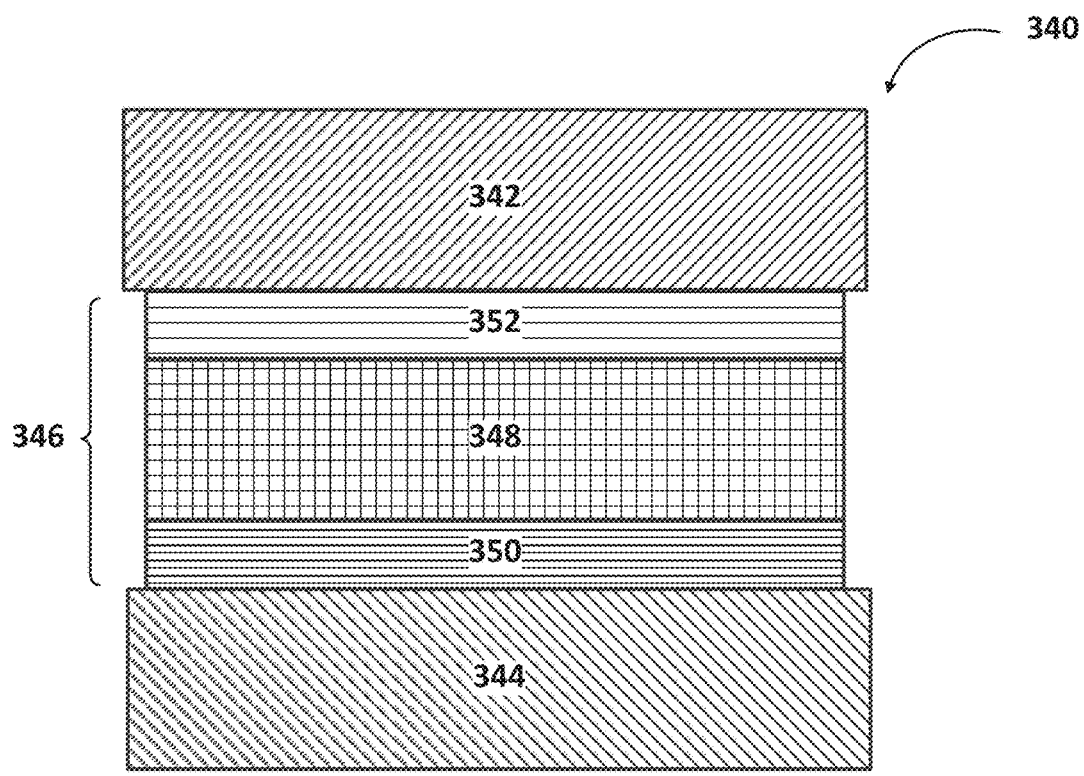
FIG. 6 shows another electrochemical cell including another electrolyte system according to various aspects of the present disclosure.

With reference to FIG. 6, another electrochemical cell 340 according to certain aspects of the present disclosure is provided. The electrochemical cell 340 includes a positive electrode 342, a negative electrode 344, and an electrolyte system 346. The positive and negative electrodes 342, 344 may be similar to the positive and negative electrodes 312, 314 of the electrochemical cell 310 of FIG. 5. The electrolyte system 346 may include a solid component 348, a high-dielectric-constant aprotic solvent, such as an ether-based electrolyte 350, and another electrolyte 352. The other electrolyte 352 may be disposed between the positive electrode 342 and the solid component 348.

When the solid component 348 is impermeable, the electrolytes 350, 352 may be different. Therefore, the electrolyte 350 may be selected to be particularly suitable for use with the positive electrode 342. In various aspects, positive electrode 342 may include a sulfur-based electroactive material, the negative electrode 344 may include lithium metal, and the other electrolyte 352 may include a carbonate solvent. Example carbonate solvents include: cyclic carbonates (e.g., ethylene carbonate (EC), propylene carbonate (PC), butylene carbonate (BC), fluoroethylene carbonate (FEC)); acyclic (i.e., linear) carbonates (e.g., dimethyl carbonate (DMC), diethyl carbonate (DEC), ethylmethylcarbonate (EMC)). Furthermore, when the solid component 348 is impermeable, it may suitably shut down any parasitic polysulfide shuttle in a lithium-sulfur battery, thereby improving cycling efficiency and cycle life.

Composite Solid-State Electrolytes Including Insoluble Sulfide and Oxy-Sulfide Glasses In various aspects, a solid component (see, e.g., solid component 318 of FIG. 5, solid component 348 of FIG. 6) of an electrolyte system may include multiple distinct solid components or compositions and may be referred to as a multi-component SSE. More particularly, the multi-component SSE may include (1) a sulfide or oxy-sulfide glass or glass-ceramic, as described above; and (2) a polymeric component. The polymeric component may be or include polyethylene oxide (PEO). The multi-component SSE may advantageously combine desirable attributes of each of the components, so that it has a high ionic conductivity and high shear modulus while being compliant enough to maintain contact with the negative electrode after dendrite growth. The multi-component SSE can have a composite structure or a laminate structure. The laminate structure may include one or more layers each of the polymer and the sulfide or oxy-sulfide, glass or glass-ceramic electrolyte.

In various aspects, the multi-component SSE is referred to as a "lithium-deposit-blocking layer" or a "dendrite-blocking layer." One suitable example of the dendrite-blocking layer is discussed in U.S. patent application Ser. No. 15/677,760 (Filing Date: Aug. 15, 2017; Title: "Lithium Metal Battery with Hybrid Electrolyte System"; Inventors: Fang Dai, Li Yang, Thomas A. Yersak, James R. Salvador, and Mei Cai), herein incorporated by reference in its entirety.

Example 1: Sulfide and Oxy-Sulfide Glass Electrolytes Synthesized Via Splat Quenching and Melt Quenching Five different sulfide or oxy-sulfide glass ingots are prepared via melt quenching in sealed quartz ampoules or by splat quenching in argon, as indicated in Table 5 below. One suitable example of a melt quenching process is described in U.S. patent application Ser. No. 15/480,505 (Filing Date: Apr. 6, 2017; Title: "Sulfide and Oxy-Sulfide Glass and Glass-Ceramic Films for Batteries Incorporating Metallic Anodes"; Inventors: Thomas A. Yersak, James R. Salvador, and Han Nguyen), herein incorporated by reference in its entirety. Samples are prepared by submerging each of the ingots in an ether-based electrolyte. The ether-based electrolyte includes a DME:DOL (1:1 v/v) solvent having 0.4M-LiTFSI+0.6M-LiNO$_3$ lithium salts dissolved therein. The samples are stored in the ether-based electrolyte for 1 month at about 23° C. After 1 month, the samples are visually examined to identify whether the ingots dissolved in the ether-based electrolyte. The results are summarized in Table 5 below.

TABLE 5

| Sample | Composition | $BDE_{WA}$ (kJ/mol) | Preparation | Solubility |
|---|---|---|---|---|
| 1 | 60Li$_2$S—28SiS$_2$—12P$_2$S$_5$ | 426.8 | Splat Quenching | Insoluble |
| 2 | 50Li$_2$S—45GeS$_2$—5GeO$_2$ | 478.4 | Splat Quenching | Insoluble |
| 3 | 50Li$_2$S—50P$_2$S$_5$ | 339.2 | Melt Quenching | Soluble |
| 4 | 60Li$_2$S—40P$_2$S$_5$ | 336.7 | Melt Quenching | Soluble |
| 5 | 70Li$_2$S—30P$_2$S$_5$ | 333.5 | Melt Quenching | Soluble |

Figure 7:
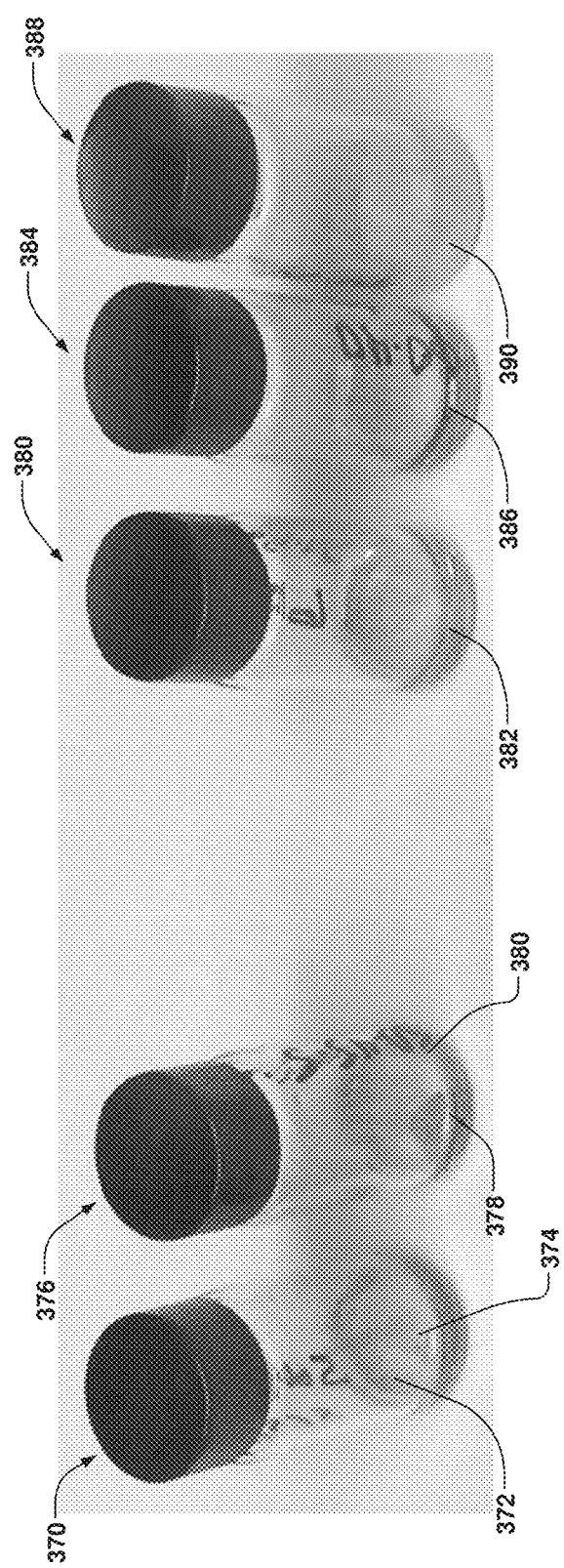
FIG. 7 is a photograph of Samples 1-5 prepared as described in Example 1 according to the principles of the present disclosure.

Referring to FIG. 7, Samples 1-5 after 1 month are shown. Sample 1 is shown at 370 and includes a first ingot 372 in ether-based solvent 374. Sample 2 is shown at 376 and includes a second ingot 378 in ether-based solvent 380. Sample 3 is shown at 380 and includes ether-based solvent having a third ingot dissolved therein 382. Sample 4 is shown at 384 and includes ether-based solvent having a fourth ingot dissolved therein 386. Sample 5 is shown at 388 and includes ether-based solvent having a fifth ingot dissolved therein 390. Samples 1-2, which both have $BDE_{WA}$>380 kJ/mol, remain undissolved in the ether-based solvent. In contrast, Samples 3-5, which have $BDE_{WA}$<380 kJ/mol dissolve in the ether-based solvent. Notably, the insoluble samples are formed from glass formers (i.e., a glass former and co-former) that primarily include high-BDE glass formers. More particularly, Sample 1 includes SiS$_2$ and P$_2$S$_5$ glass formers, with the high-BDE SiS$_2$ being present at a greater molar amount than the P$_2$S$_5$. Similarly, Sample 2 includes GeS$_2$ and GeO$_2$ glass formers, with the high-BDE GeS$_2$ being present at a greater molar amount than the GeO$_2$.

Example 2: Sulfide and Oxy-Sulfide Glass Electrolytes Synthesized via Powder Processing and Including a Reinforcement Phase Sample 6 is prepared according to the method described in Example 1. Samples 7-8 include sulfide glass billets prepared by powder processing. A powder processing preparation is discussed in U.S. patent application Ser. No. 15/631,261 (Filing Date: Jun. 23, 2017; Title: "Ionically-Conductive Reinforced Glass Ceramic Separators/Solid Electrolytes"; Inventors: Thomas A. Yersak and James Salvador), herein incorporated by reference in its entirety. The samples are prepared by submerging each of the billets in an ether-based electrolyte. The ether-based electrolyte includes a DME:DOL (1:1 v/v) solvent having 0.4M-LiTFSI+0.6M-LiNO$_3$ lithium salts dissolved therein. The samples are stored in the ether-based electrolyte for 1 month at about 23° C. After 1 month, the samples are visually examined to identify whether the billets dissolved in the ether-based electrolyte. The results are summarized in Table 6 below.

TABLE 6

| Sample | Composition | Preparation Method | $BDE_{WA}$ (kJ/mol) | Solubility |
|---|---|---|---|---|
| 6 | $60Li_2S-28SiS_2-12P_2S_5$ | Splat Quenching | 426.8 | Insoluble |
| 7 | $60Li_2S-28SiS_2-12P_2S_5$ | Powder Processing | 426.8 | Insoluble |
| 8 | $70Li_2S-30P_2S_5$ | Powder Processing | 333.5 | Soluble |

Figures 8A, 8B:
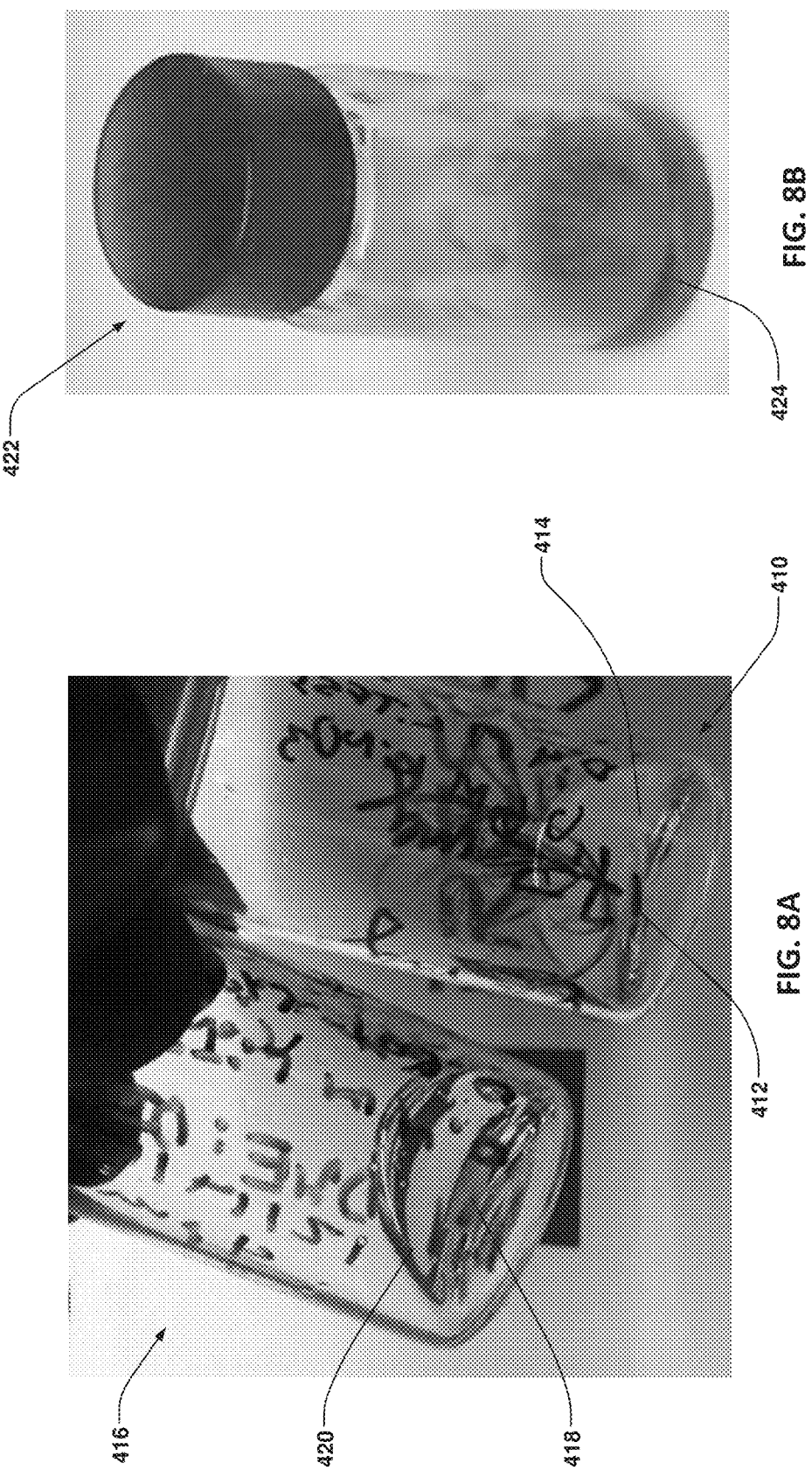
FIGS. 8A-8B are photographs of Samples 6-8 prepared as described in Example 2 according to the principles of the present disclosure.

With reference to FIGS. 8A-8B, Samples 6-8 after 1 month are shown. Sample 6 (FIG. 8A) is shown at 410 and includes a sixth ingot 412 in ether-based solvent 414. Sample 7 is shown at 416 and includes a seventh billet 418 in ether-based solvent 420. Sample 8 (FIG. 8B) is shown at 422 and includes ether-based solvent having an eighth billet dissolved therein 424. Example 2 generally demonstrates that samples having $BDE_{WA} \geq 400$ kJ/mol are insoluble in ether-based solvent regardless of the method of preparing the ingot/billet.

Example 3: A Lithium-Sulfur Cell Having an Electrolyte System Including an Ether-Based Electrolyte and a Sulfide and Oxy-Sulfide Glass and Electrolytes A first electrochemical cell includes an electrolyte system having a solid component and an ether-based electrolyte. The solid component includes an oxy-sulfide glass having the composition: $70Li_2S-25P_2S_5-5P_2O_5$($BDE_{WA}=359.9$ kJ/mol). The ether-based electrolyte includes a DME:DOL (1:1 v/v) solvent having 0.4M-LiTFSI+0.6M-LiNO$_3$ lithium salts dissolved therein. A second electrochemical cell includes another electrolyte system having another solid component and the ether-based electrolyte. The solid component includes a sulfide glass having the composition: $60Li_2S-28SiS_2-12P_2S_5$($BDE_{WA}=426.8$ kJ/mol). The sulfide glass includes a 10% by weight KEVLAR® fiber pulp reinforcement.

Figure 9:
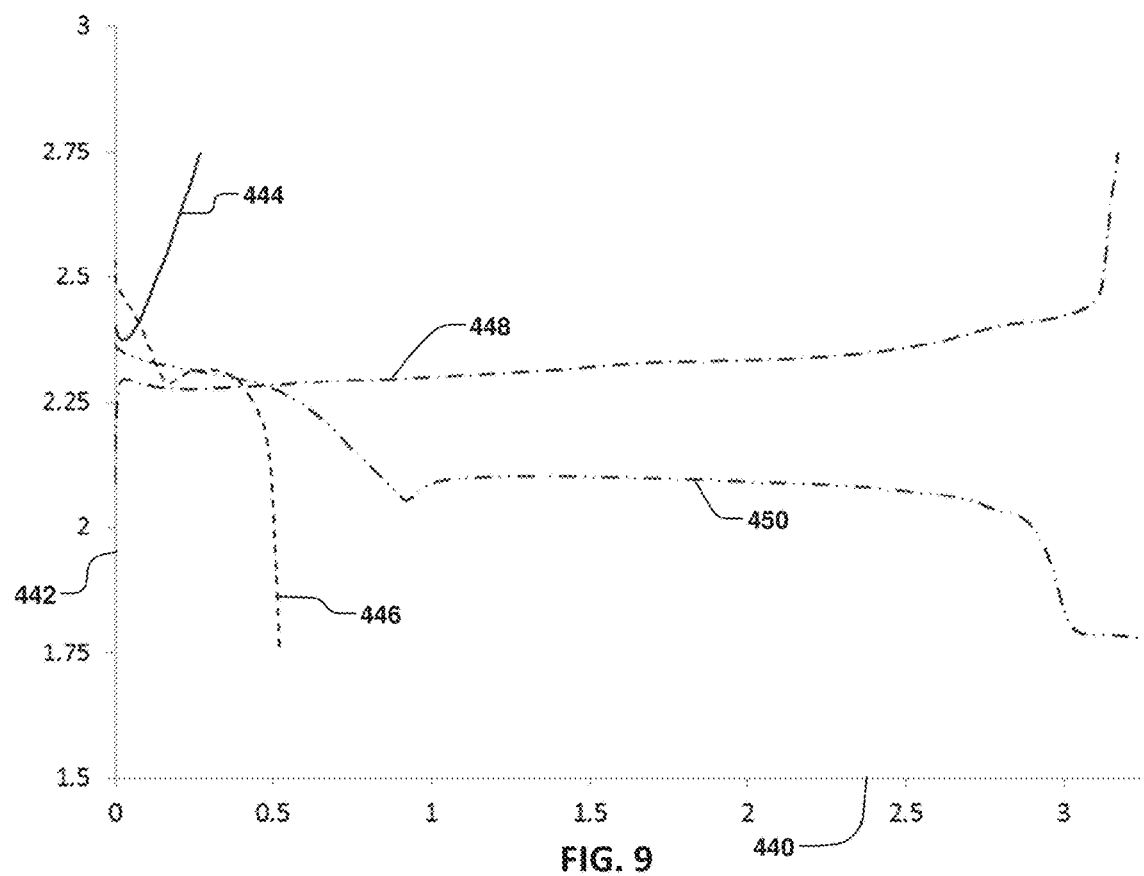
FIG. 9 shows charge and discharge curves for electrochemical cells prepared as described in Example 3 according to the principles of the present disclosure.

FIG. 9 shows charge and discharge curves for the first and second electrochemical cells. Tests are run at a voltage limit of 2.6V2.75 V-1.75 V, a charge current of 0.226 mA/cm$^2$ mA/cm$^2$, and a discharge current of 0.226 mA/cm$^2$, and a rate of C/10. An x-axis 440 represents capacity in mAh and a y-axis 442 represents voltage in V. A first cycle charge curve for the first electrochemical cell is shown at 444. A first cycle discharge curve for the first electrochemical cell is shown at 446. A first cycle charge curve for the second electrochemical cell is shown at 448. A first cycle discharge curve for the second electrochemical cell is shown at 450.

The electrolyte system of the first electrochemical cell includes the oxy-sulfide glass that is soluble in the ether-based solvent (i.e., $70Li_2S-25P_2S_5-5P_2O_5$). The solubility of the solid component in the ether-based electrolyte is believed to result in the rapid cell failure depicted in FIG. 9. In comparison, the second electrochemical cell having electrolyte system including the insoluble sulfide glass electrolyte performs during the first cycle charge and discharge without experiencing rapid cell failure.

Figure 10:
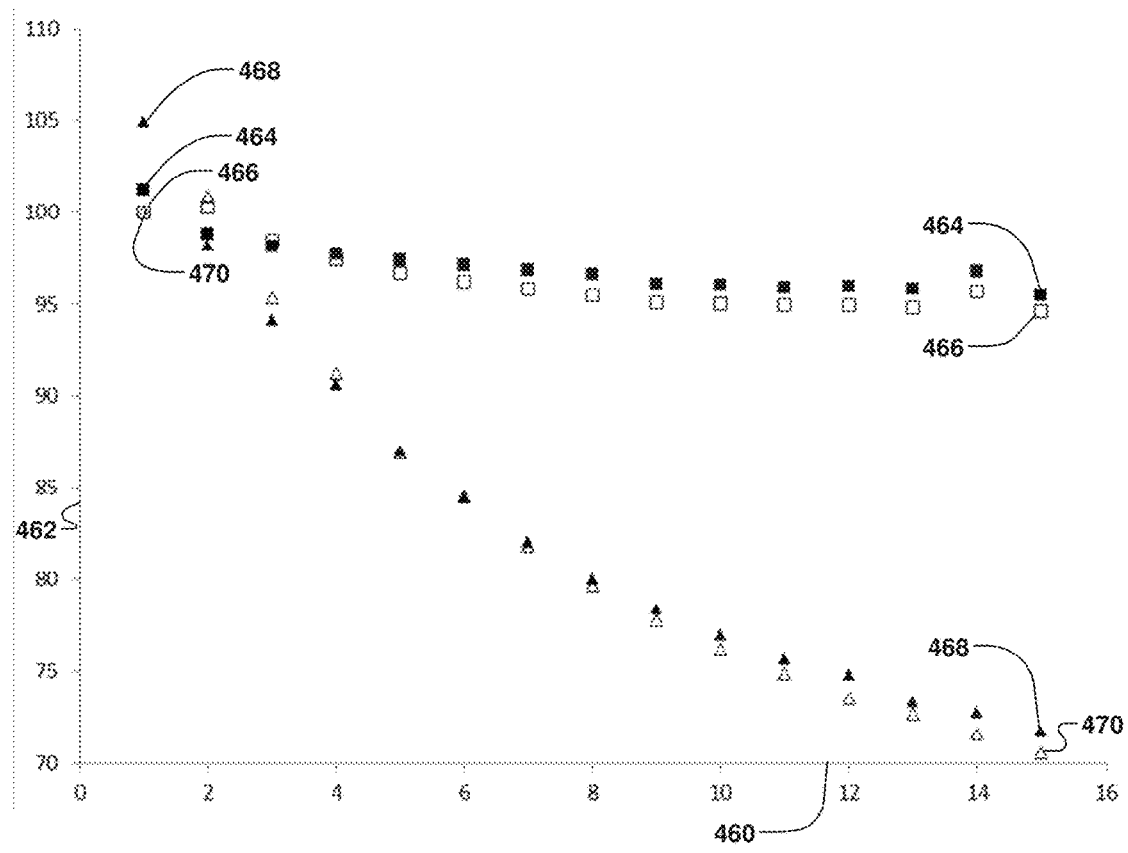
FIG. 10 shows capacity as a function of cycle for the electrochemical cells of FIG. 9 and a control cell without a glass separator.

Referring to FIG. 10, capacity of the second electrochemical cell for cycles 1-15 is shown. An x-axis 460 represents cycle index. A y-axis 462 represents percentage of first charge capacity. First data points 464 (represented by hollow squares) show charge discapacity at each cycle. Second data points 466 (represented by solid squares) show charge capacity at each cycle. Thus, the second electrochemical cell performs during the first fifteen charge and discharge cycles without experiencing cell failure.

Third data points 468 (represented by hollow triangles) show discharge capacity of a third electrochemical cell at each cycle. Fourth data points 470 (represented by solid triangles) show charge capacity of the third electrochemical cell at each cycle. The third electrochemical cell is a control cell without a glass separator. The capacity of the third electrochemical cell fades rapidly, which is believed to be a result of the parasitic polysulfide shuttle of the lithium-sulfur chemistry. In contrast, the second electrochemical cell is much more stable. The improved stability of the second electrochemical cell compared to the third electrochemical cell is believed to be a result of the impermeable glass separator's ability to shut down the parasitic polysulfide shuttle of the lithium-sulfide chemistry.

Example 4: Sulfide Glass Electrolytes with and without Dopant

Two different sulfide glasses are prepared as indicated in Table 7 below. Both samples include $Li_2S$ as a glass modifier, $SiS_2$ as a glass former, and $P_2S_5$ as a glass co-former. Sample 9 includes LiI as a dopant, while Sample 10 is free of a dopant. The samples are prepared by submerging each of the glasses in an ether-based solvent. The ether-based solvent includes a DME:DOL (1:1 v/v) solvent. The samples are stored in the ether-based solvent for 6 days at about 23° C. After 6 days, the samples are visually examined to identify whether the glasses dissolved in the ether-based solvent. The results are summarized in Table 7 below.

TABLE 7

| Sample | Composition | $BDE_{WA}$ (kJ/mol) | Preparation | Solubility |
|---|---|---|---|---|
| 9 | $53.6Li_2S-32.9SiS_2-7.5P_2S_5-6LiI$ | 452.7 | Powder Processing | Insoluble |
| 10 | $60Li_2S-28SiS_2-12P_2S_5$ | 426.8 | Melt Quenching | Insoluble |

Figure 11:
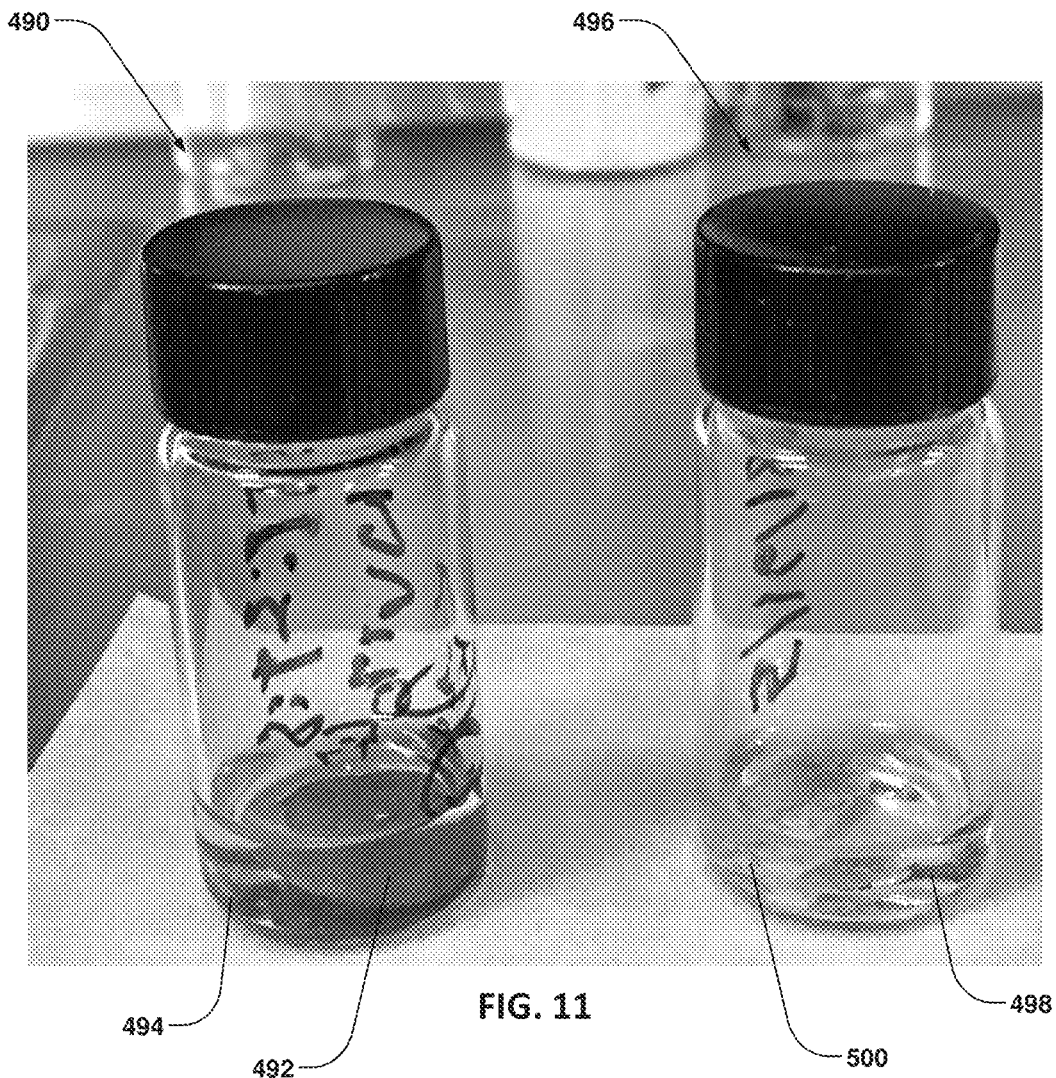
FIG. 11 is a photograph of Samples 9-10 as described in Example 4 according to the principles of the present disclosure.

Referring to FIG. 11, Samples 9-10 after 6 days are shown. Sample 8 is shown at 490 and includes a billet 492 in ether-based solvent 494. Sample 10 is shown at 496 and includes an ingot 498 in ether-based solvent 500. Both samples remain undissolved, generally indicating that the presence of dopant may not alter the relationship between $BDE_{WA}$ and insolubility.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An electrolyte system for an electrochemical cell, the electrolyte system comprising:
    an aprotic solvent with a dielectric constant of ≥3; and
    a solid component in direct communication with the aprotic solvent and comprising a sulfide or oxy-sulfide, glass or glass-ceramic electrolyte having the empirical composition $n_M(M)\text{-}n_F(F)\text{-}n_C(C)\text{-}n_D(D)$, where M is a glass modifier comprising a sulfide or a oxide, F is a glass former comprising a glass-forming sulfide or oxide, and C is a glass co-former or a glass co-modifier comprising sulfide or oxide different than the glass former and the glass modifier, D is a dopant, $n_M$ is a mole fraction of M, $n_F$ is a mole fraction of F, $n_C$ is a mole fraction of C, and $n_D$ is a mole fraction of D, wherein:
    at least one of M, F, and C comprises a sulfide;
    $n_M>0$, $n_F>0$, $n_C>0$, and $n_D>0$;
    the sulfide or oxy-sulfide, glass or glass-ceramic electrolyte has a weighted average bond dissociation enthalpy ($BDE_{WA}$) of ≥380 kJ/mol, where $$BDE_{WA} = \frac{w_M n_M BDE_M}{w_M n_M + w_F n_F + w_C n_C + w_D n_D} + \frac{w_F n_F BDE_F}{w_M n_M + w_F n_F + w_C n_C + w_D n_D} + \frac{w_C n_C BDE_C}{w_M n_M + w_F n_F + w_C n_C + w_D n_D} + \frac{w_D n_D BDE_D}{w_M n_M + w_F n_F + w_C n_C + w_D n_D},$$

wherein $BDE_M$ is a bond dissociation enthalpy required to break a single bond of distinct constituents of M, $BDE_F$ is a bond dissociation enthalpy required to break a single bond of distinct constituents of F, $BDE_C$ is a bond dissociation enthalpy required to break a single bond of distinct constituents of C, $BDE_D$ is a bond dissociation enthalpy required to break a single bond of distinct constituents of D, $w_M$ is a quantity of sulfur or oxygen bonds that M contributes to the sulfide or oxy-sulfide glass or glass-ceramic electrolyte, $w_F$ is a quantity of sulfur or oxygen bonds that F contributes to the sulfide or oxy-sulfide glass or glass-ceramic electrolyte, we is a quantity of sulfur or oxygen bonds that C contributes to the sulfide or oxy-sulfide glass or glass-ceramic electrolyte, $w_D$ is a quantity of sulfur, oxygen, iodine, or chlorine bonds that D contributes to the sulfide or oxy-sulfide glass or glass-ceramic electrolyte;
    the solid component is lithium ion-conducting and electrically insulating; and
    the sulfide or oxy-sulfide, glass or glass-ceramic electrolyte comprises: $(Li_2S)_{50}(GeS_2)45(GeO_2)5$, $(Li_2S)50SiS_2)45(GeO_2)_5$, $(Li_2S)_{57}(SiS_2)_{35}(P_2S_5)_8$, $(Li_2S)_{60}(SiS_2)_{28}(P_2S_5)_{12}$, $(Li_2S)_{53,6}(SiS_2)_{32,9}(P_2S_5)_{7,5}(LiI)_6$, or combinations thereof.

2. The electrolyte system of claim 1, wherein the aprotic solvent comprises an ether-based solvent selected from the group consisting of: 1,3-dioxolane (DOL), dimethoxyethane (DME), tetrahydrofuran, 2-methyltetrahydrofuran, 1,2-diethoxyethane, ethoxymethoxyethane, tetraethylene glycol dimethyl ether (TEGDME), polyethylene glycol dimethyl ether (PEGDME), and admixtures thereof, and wherein a lithium salt is dissolved in the ether-based solvent, the lithium salt being selected from the group consisting of: $LiN(CF_3SO_2)_2$, LiTFSI, $LiNO_3$, $LiPF_6$, $LiBF_4$, LiI, LiBr, LiSCN, $LiClO_4$, $LiAlCl_4$, $LiB(C_2O_4)_2$ (LiBOB), $LiB(C_6H5)_4$, $LiBF_2(C_2O_4)$ (LiODFB), $LiN(SO_2F)_2$ (LiFSI), $LiPF_3(C_2F_5)_3$ (LiFAP), $LiPF_4(CF_3)_2$, $LiPF_4(C_2O_4)$ (LiFOP), $LiPF_3(CF_3)_3$, $LiSO_3CF_3$, $LiCF_3SO_3$, $LiAsF_6$, and combinations thereof.

3. The electrolyte system of claim 1, wherein the solid component further comprises a polymer and has one of: (a) a composite structure including the polymer and the sulfide or oxy-sulfide, glass or glass-ceramic electrolyte, or (b) a laminate structure including one or more layers of the polymer and the sulfide or oxy-sulfide, glass or glass-ceramic electrolyte.

4. An electrochemical cell comprising:
    a positive electrode comprising a positive electroactive material;
    a negative electrode comprising a negative electroactive material;
    an electrolyte system disposed between the positive electrode and the negative electrode, the electrolyte system comprising:
        an aprotic solvent with a dielectric constant of ≥3; and
        a solid component in direct communication with the aprotic solvent and comprising a sulfide or oxy-sulfide, glass or glass-ceramic electrolyte having the empirical composition $n_M(M)\text{-}n_F(F)\text{-}n_C(C)\text{-}n_D(D)$, where M is a glass modifier comprising a sulfide or a oxide, F is a glass former comprising a glass-forming sulfide or oxide, and C is a glass co-former or glass co-modifier comprising a sulfide or oxide different than the glass former and the glass modifier, D is a dopant, $n_M$ is a mole fraction of M, $n_F$ is a mole fraction of F, $n_C$ is a mole fraction of C, and $n_D$ is a mole fraction of D, wherein:
    at least one of the M, F, and C comprises a sulfide;
    $n_m>0$, $n_F>0$, $n_C\geq0$, and $n_D\geq0$;
    the sulfide or oxy-sulfide, glass or glass-ceramic electrolyte has a weighted average bond dissociation enthalpy ($BDE_{WA}$) of ≥380 kJ/mol, where $$BDE_{WA} = \frac{w_M n_M BDE_M}{w_M n_M + w_F n_F + w_C n_C + w_D n_D} + \frac{w_F n_F BDE_F}{w_M n_M + w_F n_F + w_C n_C + w_D n_D} + \frac{w_C n_C BDE_C}{w_M n_M + w_F n_F + w_C n_C + w_D n_D} + \frac{w_D n_D BDE_D}{w_M n_M + w_F n_F + w_C n_C + w_D n_D},$$

wherein $BDE_M$ is a bond dissociation enthalpy required to break a single bond of distinct constituents of M, $BDE_F$ is a bond dissociation enthalpy required to break a single bond of distinct constituents of F, $BDE_C$ is a bond dissociation enthalpy required to break a single bond of distinct constituents of C, $BDE_D$ is a bond dissociation enthalpy required to break a single bond of distinct constituents of D, $w_M$ is a quantity of sulfur or oxygen bonds that M contributes to the sulfide or oxy-sulfide glass or glass-ceramic electrolyte, $w_F$ is a quantity of sulfur or oxygen bonds that F contributes to the sulfide or oxy-sulfide glass or glass-ceramic electrolyte, we is a quantity of sulfur or oxygen bonds that C contributes to the sulfide or oxy-sulfide glass or glass-ceramic electrolyte, and wD is a quantity of sulfur, oxygen, iodine, or chlorine bonds that D contributes to the sulfide or oxy-sulfide glass or glass-ceramic electrolyte;

the solid component is lithium ion-conducting and electrically insulating; and the sulfide or oxy-sulfide, glass or glass-ceramic electrolyte comprises: $(Li_2S)_{50}(GeS_2)_{45}(GeO_2)_5$, $(Li_2S)_{50}(SiS_2)_{45}(GeO_2)_5$, $(Li_2S)_{57}(SiS_2)_{35}(P_2S_5)_8$, $(Li_2S)_{60}(SiS_2)_{28}(P_2S_5)_{12}$, $(Li_2S)_{53.6}(SiS_2)_{32.9}(P_2S_5)_{7.5}(LiI)_6$, or combinations thereof.

5. The electrochemical cell of claim 4, wherein the positive electroactive material comprises sulfur.

6. The electrochemical cell of claim 4, wherein:
the aprotic solvent comprises an ether-based solvent;
the negative electroactive material is in communication with the ether-based solvent; and
the negative electroactive material comprises lithium.

7. The electrochemical cell of claim 4, wherein the aprotic solvent comprises an ether-based solvent selected from the group consisting of: 1,3-dioxolane (DOL), dimethoxyethane (DME), tetrahydrofuran, 2-methyltetrahydrofuran, 1,2-diethoxyethane, ethoxymethoxyethane, tetraethylene glycol dimethyl ether (TEGDME), polyethylene glycol dimethyl ether (PEGDME), and admixtures thereof, and wherein a lithium salt is dissolved in the ether-based solvent, the lithium salt being selected from the group consisting of: $LiN(CF_3SO_2)_2$, LiTFSI, $LiNO_3$, $LiPF_6$, $LiBF_4$, LiI, LiBr, LiSCN, $LiClO_4$, $LiAlCl_4$, $LiB(C_2O_4)_2$ (LiBOB), $LiB(C_6H_5)_4$, $LiBF_2(C_2O_4)$ (LiODFB), $LiN(SO_2F)_2$ (LiFSI), $LiPF_3(C_2F_5)_3$ (LiFAP), $LiPF_4(CF_3)_2$, $LiPF_4(C_2O_4)$ (LiFOP), $LiPF_3(CF_3)_3$, $LiSO_3CF_3$, $LiCF_3SO_3$, $LiAsF_6$, and combinations thereof.

8. The electrochemical cell of claim 4, wherein the solid component further comprises a polymer.

9. The electrochemical cell of claim 8, wherein the solid component has one of: (a) a composite structure including the polymer and the sulfide or oxy-sulfide, glass or glass-ceramic electrolyte, or (b) a laminate structure including one or more layers of the polymer and the sulfide or oxy-sulfide, glass or glass-ceramic electrolyte.

10. The electrolyte system of claim 1, wherein the sulfide or oxy-sulfide, glass or glass-ceramic electrolyte comprises: $(Li_2S)_{50}(GeS_2)_{45}(GeO_2)_5$, $(Li_2S)_{50}(SiS_2)_{45}(GeO_2)_5$, $(Li_2S)_{53.6}(SiS_2)_{32.9}(P_2S_5)_{7.5}(LiI)_6$, or combinations thereof.

11. The electrolyte system of claim 1, wherein the sulfide or oxy-sulfide, glass or glass-ceramic electrolyte comprises: $(Li_2S)_{50}(GeS_2)_{45}(GeO_2)_5$.

12. The electrolyte system of claim 1, wherein the sulfide or oxy-sulfide, glass or glass-ceramic electrolyte comprises $(Li_2S)_{50}(SiS_2)_{45}(GeO_2)_5$.

13. The electrolyte system of claim 1, wherein the sulfide or oxy-sulfide, glass or glass-ceramic electrolyte comprises $(Li_2S)_{53.6}(SiS_2)_{32.9}(P_2S_5)_{7.5}(LiI)_6$.

14. The electrolyte system of claim 1, wherein the solid component further includes a reinforcement phase.

15. The electrolyte system of claim 1, wherein the sulfide or oxy-sulfide, glass or glass-ceramic electrolyte is at least partially devitrified.

16. The electrolyte system of claim 15, wherein the sulfide or oxy-sulfide, glass or glass-ceramic electrolyte is fully devitrified.

17. The electrochemical cell of claim 4, wherein the sulfide or oxy-sulfide, glass or glass-ceramic electrolyte comprises: $(Li_2S)_{50}(GeS_2)_{45}(GeO_2)_5$, $(Li_2S)_{50}(SiS_2)_{45}(GeO_2)_5$, $(Li_2S)_{53.6}(SiS_2)_{32.9}(P_2S_5)_{7.5}(LiI)_6$, or combinations thereof.

18. The electrochemical cell of claim 4, wherein the solid component further includes a reinforcement phase.

19. The electrochemical cell of claim 4, wherein the sulfide or oxy-sulfide, glass or glass-ceramic electrolyte is at least partially devitrified.

20. The electrochemical cell of claim 19, wherein the sulfide or oxy-sulfide, glass or glass-ceramic electrolyte is fully devitrified.

* * * * *